US012142267B2

(12) United States Patent
Naik et al.

(10) Patent No.: US 12,142,267 B2
(45) Date of Patent: Nov. 12, 2024

(54) PRESENCE-BASED APPLICATION INVOCATION

(71) Applicant: Amazon Technologies, Inc., Seattle, WA (US)

(72) Inventors: Apoorv Naik, Carlsbad, CA (US); Mihail C Dinescu, Irvine, CA (US); Bharath Bhimanaik Kumar, Sammamish, WA (US); Matthew Todd Kaufman, Truckee, CA (US); Ganesha Batta, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 626 days.

(21) Appl. No.: 17/348,567

(22) Filed: Jun. 15, 2021

(65) Prior Publication Data

US 2022/0399016 A1     Dec. 15, 2022

(51) Int. Cl.
*H04W 4/02* (2018.01)
*G10L 15/22* (2006.01)

(52) U.S. Cl.
CPC .......... *G10L 15/22* (2013.01); *H04W 4/023* (2013.01); *G10L 2015/223* (2013.01)

(58) Field of Classification Search
USPC .................. 704/1–275; 706/1–62, 900–903
See application file for complete search history.

(56) References Cited

U.S. PATENT DOCUMENTS

| 10,031,727 | B1* | 7/2018 | Roman ................... G06F 8/30 |
| 10,757,207 | B1* | 8/2020 | Kharwandikar ....... G08B 21/22 |
| 11,437,043 | B1* | 9/2022 | Peng .................... G06N 3/0442 |
| 2018/0007558 | A1 | 1/2018 | Maragoudakis |
| 2019/0235831 | A1* | 8/2019 | Bao ........................ G10L 15/19 |
| 2022/0068271 | A1* | 3/2022 | Berg ...................... H04S 7/301 |
| 2022/0189474 | A1* | 6/2022 | Sharifi ................. G06F 3/0481 |
| 2022/0279063 | A1* | 9/2022 | Coffman ............... G06F 3/0482 |

FOREIGN PATENT DOCUMENTS

AU     2012100568 A4     6/2012

OTHER PUBLICATIONS

The PCT Search Report and Written Opinion mailed Aug. 31, 2022, for PCT application No. PCT/US22/32305, 58 pages.

* cited by examiner

*Primary Examiner* — Marcellus J Augustin
(74) *Attorney, Agent, or Firm* — Pierce Atwood LLP

(57) ABSTRACT

Systems and methods for presence-based application invocation are disclosed. For example, presence of a personal device and/or user associated with a personal device is detected at a primary device. When account data associated with the personal device and the primary device correspond, checks are performed to determine if automatic invocation of an application associated with the personal device should be performed. Those checks include determining whether one or more conditions are satisfied, determining current usage of the application and/or the primary device indicates desirability to automatically invoke the application, and/or whether the application has been enabled for use on the primary device.

20 Claims, 9 Drawing Sheets

600 ─┐

┌─────────────────────────────────────────────────────────────────────┐
│ Receive, from voice interface device, first data indicating that first device is in │
│ proximity of voice interface device, first data including device identifier of first device │
│ 602 │
└─────────────────────────────────────────────────────────────────────┘
                                    ↓
┌─────────────────────────────────────────────────────────────────────┐
│ Determine, utilizing device identifier, account data that has been associated with first │
│ device │
│ 604 │
└─────────────────────────────────────────────────────────────────────┘
                                    ↓
┌─────────────────────────────────────────────────────────────────────┐
│ Determine that voice interface device is associated with account data when first data is │
│ received │
│ 606 │
└─────────────────────────────────────────────────────────────────────┘
                                    ↓
┌─────────────────────────────────────────────────────────────────────┐
│ Determine, utilizing device identifier, skill associated with first device, skill configured │
│ to be utilized by speech processing system to perform actions responsive to voice │
│ commands │
│ 608 │
└─────────────────────────────────────────────────────────────────────┘
                                    ↓
┌─────────────────────────────────────────────────────────────────────┐
│ Receive second data indicating condition(s) for invoking skill, condition(s) defining │
│ presence indications that are to be detected for skill to be invoked │
│ 610 │
└─────────────────────────────────────────────────────────────────────┘
                                    ↓
┌─────────────────────────────────────────────────────────────────────┐
│ Determine, utilizing third data received from sensor(s) and indicating environmental │
│ conditions associated with environment in which voice interface device is disposed, │
│ that condition(s) have been satisfied │
│ 612 │
└─────────────────────────────────────────────────────────────────────┘
                                    ↓
┌─────────────────────────────────────────────────────────────────────┐
│ Cause skill to be invoked in association with voice interface device based at least in │
│ part on: receiving first data; account data being associated with voice interface device; │
│ and condition(s) being satisfied │
│ 614 │
└─────────────────────────────────────────────────────────────────────┘
                                    ↓
┌─────────────────────────────────────────────────────────────────────┐
│ Generate, utilizing skill and based at least in part on skill being invoked, second data │
│ representing directive configured to cause voice interface device to perform action │
│ 616 │
└─────────────────────────────────────────────────────────────────────┘

FIG. 6

PRESENCE-BASED APPLICATION INVOCATION

BACKGROUND

Voice interface devices may utilize applications to respond to user voice commands. These applications may be utilized for a number of functionalities, such as providing information to users, causing actions to be performed by other devices, etc. Described herein are improvements in technology and solutions to technical problems that can be used to, among other things, enhance use of applications by voice interface devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of an example process for presence-based application invocation.

DETAILED DESCRIPTION

Figure 1:
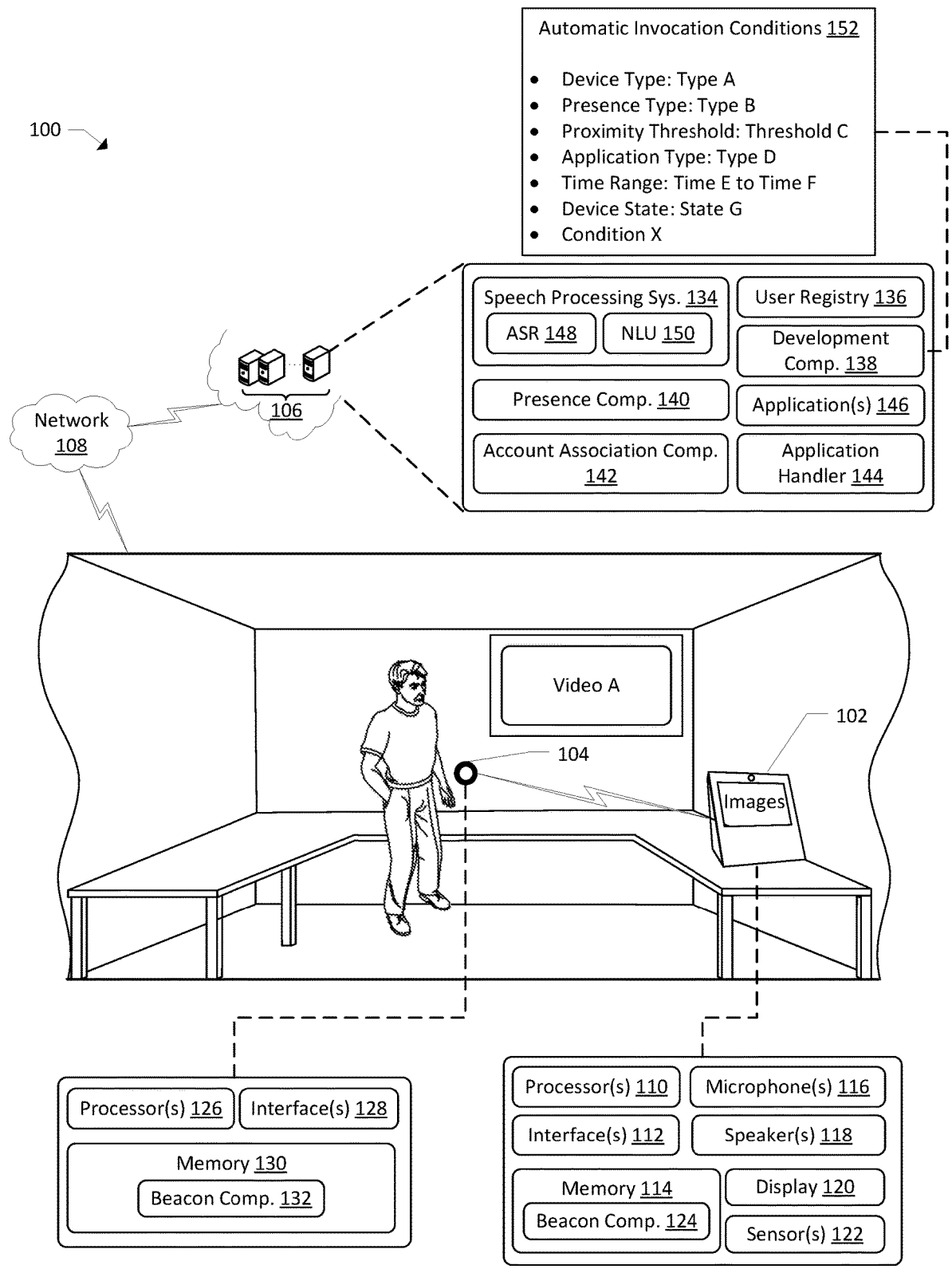
FIG. 1 illustrates a schematic diagram of an example environment for presence-based application invocation.

Systems and methods for presence-based application invocation are disclosed. Take, for example, an environment (such as a home, hotel, vehicle, office, store, restaurant, or other space) where one or more users may be present. The environments may include one or more electronic devices that may be utilized by the users. For example, the electronic devices may include voice interface devices (e.g., Echo devices, mobile phones, tablets, personal computers, televisions, appliances like refrigerators and microwaves, etc.), graphical interface devices (e.g., televisions, set top boxes, virtual/augmented reality headsets, etc.), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example. As used herein, a "primary device" may include an electronic device that receives a signal from a personal device associated with a user and that communicates with another system, such as a speech processing system for example. Example primary devices may include voice interface devices situated in a home, place of business, vehicle, etc. Personal devices may be electronic devices that are associated with a given user and/or set of users. Example personal devices include phones, wearable devices, laptops, and/or any other device that is configured to send a signal to a primary device.

Generally, primary devices may utilize applications to respond to user requests. Utilizing a voice interface primary device as an example, the primary device may be configured to receive audio representing voice input, and speech processing may be performed on the corresponding audio data to determine a user request and to perform an action in response to the user request. To do so, a speech processing system may utilize one or more applications, which for example may be one or more skills as described more fully below, to service user requests. For example, a given application may be configured to service user requests associated with outputting music, while other applications may be configured to service user requests to order products, provide requested information, play games, display images, output requested video, etc. Each of these applications may be enabled for use by a given primary device based on user input requesting enablement. Thereafter, these applications may be invoked to perform actions in response to receiving user input, such as voice input, requesting performance of such actions.

However, in examples, automatic invocation of applications to perform actions without receiving user input may be desirable. To do so, in examples, detection of a presence event may be performed. Detection of the presence event may be based at least in part on a signal received at a primary device from a personal device. For example, the personal device may be configured to periodically or otherwise emit a signal that may be received at the primary device. The signal may include data indicating a device identifier of the personal device and/or a device type of the personal device. The primary device may receive the signal and may send presence data to a system associated with the primary device. The presence data sent to the system may include the device identifier for the personal device, the device type, an identifier of the primary device that received the signal, and/or other data associated with the received signal and/or environmental conditions associated with the primary device when the signal was received. For example, the data may include signal strength data, timing data, account identifiers, and/or sensor data from the primary device and/or one or more other devices associated with an environment in which the primary device is situated. The sensor data may include, for example, audio data, image data, device state data, device usage data, etc.

A presence component of the system may utilize the presence data to detect a presence event. Detection of the presence event may include determining that the personal device is in proximity to the primary device. The presence event may additionally, or alternatively, include the personal device being within a threshold distance of the primary device, detection of user speech and/or user movement, detection of a user based on image data, etc. A presence indicator corresponding to the presence event may be generated and may be sent to an account association component of the system.

The account association component may be configured to determine account data associated with the personal device and the primary device involved in the presence event. For example, the signal from the personal device may include the device identifier of the personal device. The device identifier may be associated with given account data, such as when the device and/or an application residing on the device is registered and/or otherwise setup by a user. Additionally, the primary device may be associated with account data. The account data may be associated with the primary device during an out-of-the-box experience and/or account data may be dynamically associated with a primary device over time. For example, when the primary device is disposed in a communal space and/or a space where users reside temporarily, such as a hotel, place of business, etc., then users authorized to utilize the primary device may change over time and thus account data for those users may be associated with the primary device over time as well. In these and other examples, the account association component may determine whether the account data associated with the personal device corresponds to account data associated with the primary device at the time of the presence event. Utilizing a hotel embodiment as an example, a user may check in to a room of a hotel that includes a primary device. The hotel check-in process may include causing the primary device to be associated with an account associated with the hotel guest and that account may also be associated with the personal device of the user. In this example, the guest's personal device and the primary device of the user's room are associated with the same account data, whereas other primary devices of other rooms are not associated with the user's account data. When the account data of the personal device corresponds to account data of the primary device, the process of automatically invoking one or more applications on the primary device may continue.

The account association component may then send data associated with the presence event to an application handler. The data associated with the presence event may be any data that may be utilized by the application handler to identify the application to be invoked based at least in part on the presence event. In examples, this data may be the device identifier of the personal device and/or a device type of the personal device. The application handler may then determine which application of multiple applications is associated with the personal device. For example, the personal device may be a wristband utilized to, among other things, gain access to activities associated with a hotel. By way of example and not as a limitation, those activities may include gaining access to hotel attractions, gaining access to pictures taken while at the attractions, etc. An application may have been developed for performing actions associated with the wristband, such as to view pictures. The application handler may determine which application is associated with the personal device utilizing the data described herein.

Additionally, the application handler may be configured to determine whether one or more conditions for the automatic invocation of the selected application have been met. The one or more conditions may have been predefined based on developer input associated with the application and/or based at least in part on user preferences and/or settings associated with the speech processing system. Some non-limiting examples of conditions include device type of the personal device and/or the primary device, detected presence type, personal device proximity thresholds, a type of the application at issue, timing conditions, device state conditions, time lapse since last invocation of the application, device settings, and/or application functionality. Additional conditions may include, for example, whether the user account at issue has stored an indication that the user has opted out of automatic invocation of applications. In these examples, a user may request, such as through input to a personal device and/or through voice input, that automatic invocation of applications, and/or certain applications, not occur. Data indicating this user input may be stored in the user account. Additional conditions may include other indicators that a user and/or entity associated with the personal device, the primary device, the environment in which the primary device is disposed, etc. has requested that automatic invocation of applications, and/or certain applications, not occur.

When the one or more conditions are met, the application handler may determine whether the application has been enabled for use on the primary device. For example, the application may be one of hundreds if not thousands of potential applications that may be available to the primary device to respond to user commands. Generally, select applications are first enabled for use on the primary device before those applications can be invoked. As such, the application handler may determine if the application at issue is enabled, and if not, may cause the application to be enabled. This process may be performed, in examples, without requesting user input. When an application is enabled for use, as described herein, the enablement may include selection of the application for a library of applications usable by the primary device, provision of credentials to utilizing the application, purchasing a right to use the application, and/or any other action that allows the primary device to utilize the application.

The application handler may then determine whether the application at issue is already invoked on the primary device. For example, when the application is utilized for displaying photographs on a display of the primary device, a user may provide user input requesting display of such photographs and the application may be invoked to cause the photographs to be displayed. When the presence event is detected, the application may already be invoked such that the primary device is already displaying the photographs. In these examples, the system may determine to refrain from interrupting the existing use of the application by attempting to invoke the application again in response to the presence event. However, in examples where the application is not currently invoked, the application handler may send an invocation request and context data associated with the request to the application.

The context data may include any data associated with the presence event, the processes performed prior to sending the invocation request to the application, and/or any other information that may be utilized by the application to perform actions. For example, the context data may indicate that the invocation request is being made based on detection of a presence event instead of based on voice input requesting invocation. The context data may also include the personal device information, which may assist the application in invoking the application in a certain way that is specific to the personal device in question. Utilizing the photograph example above, the device identifier of the personal device may be utilized to determine which photos are to be displayed, such as photos of a specific user associated with the personal device. In this way, the context data may be utilized to invoke the application to provide a personalized experience for the user.

The application may then return an invocation response. The invocation response may include data representing a directive to be performed by the primary device and/or the personal device. Examples of directives include instructions to cause the primary device to output audio and/or images, cause another device to perform an action, cause the personal device to perform an action, etc. The data representing the directive may be sent to the primary device and/or to the personal device to perform an action based on the directive. By so doing, detection of a presence event, such as detection of a personal device within a proximity of a primary device, may cause an application associated with that personal device to be automatically invoked without the user providing user input, such as voice input, as would more typically be done. The predefined conditions described herein may limit automatic invocation to situations where doing so would be desirable and secure.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for presence-based application invocation. The system 100 may include, for example, one or more primary devices 102 and one or more personal devices 104. In certain examples, the devices 102, 104 may be a voice-enabled device (e.g., Echo devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In examples, the devices 102, 104 may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, hotel, etc.), for example. The devices 102, 104 may be configured to send data to and/or receive data from a system 106, such as via a network 108. It should be understood that where operations are described herein as being performed by the system 106, some or all of those operations may be performed by the devices 102, 104. It should also be understood that anytime the system 106 is referenced, that system may include any system and/or device, whether local to an environment of the devices 102, 104 or remote from that environment. Additionally, it should be understood that a given space and/or environment may include numerous electronic devices 102, 104. It should also be understood that when a "space" or "environment" is used herein, those terms mean an area and not necessarily a given room, building, or other structure, unless otherwise specifically described as such.

The primary devices 102 may include one or more components, such as, for example, one or more processors 110, one or more network interfaces 112, memory 114, one or more microphones 116, one or more speakers 118, one or more displays 120, and/or one or more sensors 122. The microphones 116 may be configured to capture audio, such as user utterances, and generate corresponding audio data. The speakers 118 may be configured to output audio, such as audio corresponding to audio data received from another device and/or the system 106. The displays 120 may be configured to display images corresponding to image data, such as image data received from the remote system 106 and/or one or more other devices. The sensors 122 may include any component configured to detect an environmental condition associated with the devices 102, 104 and/or the environment associated with the devices 102, 104. Some example sensors 122 may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors 122, usage data and/or account data may be utilized to determine if an environmental condition is present. The memory 114 of the primary devices 102 may include a beacon component 124. The beacon component 124 may be configured to receive a signal that may be sent by the personal device 104. The signal may include data associated with the personal device 104, such as a device identifier of the personal device 104 and/or a device type of the personal device 104, for example.

The personal devices 104 may include components such as, for example, one or more processors 126, one or more network interfaces 128, and memory 130. The memory 130 may include one or more components such as, for example, a beacon component 132. The beacon component 132 may be configured to send the signals described herein to the primary device 102.

It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The system 106 may include components such as, for example, a speech processing system 134, a user registry 136, a development component 138, a presence component 140, an account association component 142, an application handler 144, and/or one or more applications 146. It should be understood that while the components of the system 106 are depicted and/or described as separate from each other in FIG. 1, some or all of the components may be a part of the same system. The speech processing system 134 may include an automatic speech recognition component (ASR)

148 and/or a natural language understanding component (NLU) 150. Each of the components described herein with respect to the system 106 may be associated with their own systems, which collectively may be referred to herein as the system 106, and/or some or all of the components may be associated with a single system. Additionally, the system 106 may include one or more applications, which may be described as skills. "Skills," as described herein may be applications and/or may be a subset of an application. For example, a skill may receive data representing an intent. For example, an intent may be determined by the NLU component 150 and/or as determined from user input via a computing device. Skills may be configured to utilize the intent to output data for input to a text-to-speech component, a link or other resource locator for audio data, and/or a command to a device, such as the devices 102, 104. "Skills" may include applications running on devices, such as the devices 102, 104, and/or may include portions that interface with voice user interfaces of devices 102, 104.

In instances where a voice-enabled device is utilized, skills may extend the functionality of devices 102, 104 that can be controlled by users utilizing a voice-user interface. In some examples, skills may be a type of application that may be useable in association with personal devices 104 and may have been developed specifically to work in connection with given personal devices 104. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

The components of the primary devices 102, the personal devices 104, and the system 106 are described in detail below. In examples, some or each of the components of the system 106 may include their own processor(s), network interface(s), and/or memory. As such, by way of example, the speech processing system 134 may include and/or be associated with processor(s), network interface(s), and/or memory. The other components of the system 106, such as the presence component 140, may include and/or be associated with different processor(s), network interface(s), and/ or memory, or one or more of these components may utilize some or all of the same processor(s), network interface(s), and/or memory utilized by the speech processing system 134. These components are described in detail below. Additionally, the operations and/or functionalities associated with and/or described with respect to the components of the system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the system 106, the user registry 136 may be configured to determine and/or generate associations between users, user accounts, environment identifiers, and/ or devices. For example, one or more associations between user accounts may be identified, determined, and/or generated by the user registry 136. The user registry 136 may additionally store information indicating one or more applications and/or resources accessible to and/or enabled for a given user account. Additionally, the user registry 136 may include information indicating device identifiers, such as naming identifiers, associated with a given user account, as well as device types associated with the device identifiers. The user registry 136 may also include information indicating user account identifiers, naming indicators of devices associated with user accounts, and/or associations between devices, such as the devices 102, 104. The user registry 136 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 134 may be configured to receive audio data from the primary devices 102 and/or other devices and perform speech-processing operations. For example, the ASR component 148 may be configured to generate text data corresponding to the audio data, and the NLU component 150 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "display my photographs," the NLU component 150 may identify a "display images" intent and the payload may be "my photographs." In this example where the intent data indicates an intent to cause photographs associated with a personal device 104 to be displayed, the speech processing system 134 may call one or more speechlets to effectuate the intent. Speechlets, as described herein may otherwise be described as applications and may include functionality for utilizing intent data to generate directives and/or instructions. For example, a speechlet associated with the personal device 104 may be called. The speechlet may be designated as being configured to handle the intent of identifying the requested photographs and providing instructions for causing the primary device 102 to display the photographs, for example. The speechlet may receive the intent data and/or other data associated with the user utterance from the NLU component 150, such as by an orchestrator of the system 106, and may perform operations to instruct the primary device 102 display the photographs, for example. The system 106 may generate audio data confirming that the requested photographs are being displayed, such as by a text-to-speech component. The audio data may be sent from the system 106 to the primary device 102.

The components of the system 100 are described below by way of example. For example, detection of a presence event associated with a primary device 102 may be performed. Detection of the presence event may be based at least in part on a signal received at a primary device 102 from a personal device 104. For example, the personal device 104 may be configured to periodically or otherwise emit a signal that may be received at the primary device 102. The signal may include data indicating a device identifier of the personal device 104 and/or a device type of the personal device 104. The primary device 102 may receive the signal and may send presence data to the system 106. The presence data sent to the system 106 may include the device identifier for the personal device 104, the device type, an identifier of the primary device 102 that received the signal, and/or other data associated with the received signal and/or environmental conditions associated with the primary device 102 when the signal was received. For example, the data may include signal strength data, timing data, account identifiers, and/or sensor data from the primary device 102 and/or one or more other devices associated with an environment in which the primary device 102 is situated. The sensor data may include, for example, audio data, image data, device state data, device usage data, etc.

The presence component 140 of the system may utilize the presence data to detect a presence event. Detection of the presence event may include determining that the personal device 104 is in proximity to the primary device 102. The presence event may additionally, or alternatively, include the personal device 104 being within a threshold distance of the primary device 102, detection of user speech and/or user movement, detection of a user based on image data, etc. A presence indicator corresponding to the presence event may be generated and may be sent to the account association component 142. Additional details on the detection of a presence event are provided below with respect to FIG. 9.

The account association component 142 may be configured to determine account data associated with the personal device 104 and the primary device 102 involved in the presence event. For example, the signal from the personal device 104 may include the device identifier of the personal device 104. The device identifier may be associated with given account data, such as when the device is registered and/or otherwise setup by a user. Additionally, the primary device 102 may be associated with account data. The account data may be associated with the primary device 102 during an out-of-the-box experience and/or account data may be dynamically associated with a primary device 102. For example, when the primary device 102 is disposed in a communal space and/or a space where users reside temporarily, such as a hotel, place of business, etc., then users authorized to utilize the primary device 102 may change over time and thus account data for those users may be associated with the primary device 102 over time as well. In these and other examples, the account association component 142 may determine whether the account data associated with the personal device 104 corresponds to account data associated with the primary device 102. Utilizing a hotel embodiment as an example, a user may check into a room of a hotel that includes a primary device 102. The hotel check-in process may include causing the primary device 102 to be associated with an account associated with the hotel guest and that account may also be associated with the personal device 104 of the user. In this example, the guest's personal device 104 and the primary device 102 of the user's room are associated with the same account data, whereas other primary devices 102 of other rooms are not associated with the user's account data. When the account data of the personal device 104 corresponds to account data of the primary device 102, the process of automatically invoking one or more applications on the primary device 102 may continue.

The account association component 142 may then send data associated with the presence event to the application handler 144. The data associated with the presence event may be any data that may be utilized by the application handler 144 to identify the application 146 to be invoked based at least in part on the presence event. In examples, this data may be the device identifier of the personal device 104 and/or a device type of the personal device 104. The application handler 144 may then determine which application of multiple applications 146 is associated with the personal device 104. For example, the personal device 104 may be a wristband utilized to, among other things, gain access to activities associated with a hotel. Those activities may include gaining access to hotel attractions, gaining access to pictures taken while at the attractions, etc. An application 146 may have been developed for performing actions associated with the wristband, such as to view the taken pictures. The application handler 144 may determine which application 146 is associated with the personal device 104 utilizing the data described herein.

Additionally, the application handler 144 may also be configured to determine whether one or more conditions for the automatic invocation of the selected application 146 have been met. The one or more conditions may have been predefined based on developer input associated with the application 146 and/or based at least in part on user preferences and/or settings associated with the speech processing system. The development component 138 may be configured to receive input indicating the one or more conditions described herein. Additional input that may be received and utilized by the development component 138 includes contexts associated with automatic invocation of applications 146, actions performable by the applications 146, etc. Some nonlimiting examples of conditions include device type, detected presence type, personal device proximity thresholds, a type of the application at issue, timing conditions, device state conditions, time lapse since last invocation of the application, device settings, and/or application functionality. Additional conditions may include, for example, whether the user account at issue has stored an indication that the user has opted out of automatic invocation of applications 146. In these examples, a user may request, such as through input to a personal device and/or through voice input, that automatic invocation of applications 146, and/or certain applications 146, not occur. Data indicating this user input may be stored in the user account. Additional conditions may include other indicators that a user and/or entity associated with the personal device, the primary device, the environment in which the primary device is disposed, etc. has requested that automatic invocation of applications 146, and/or certain applications, not occur. When the one or more conditions are met, the application handler 144 may determine whether the application 146 has been enabled for use on the primary device 102. For example, the application 146 may be one of hundreds if not thousands of potential applications that may be utilized by the primary device 102 to respond to user commands. Generally, select applications 146 are first enabled for use on the primary device 102 before those applications 146 can be invoked. As such, the application handler 144 may determine if the application 146 at issue is enabled, and if not, may cause the application 146 to be invoked. This process may be performed, in examples, without requesting user input.

As shown in FIG. 1, the development component 138 may be utilized to determine one or more automatic invocation conditions 152 to apply when presence is detected within an environment. Utilizing the example of FIG. 1, conditions associated with device type, presence type, proximity thresholds, application type, time range, device state, and one or more other conditions have been applied. In this example, once presence is detected as described more fully herein, the automatic invocation of an application conditions may occur when the automatic invocation conditions 152 are satisfied. In this example, the secondary device 104 may be of device Type A, such as a wearable device, the type of presence detected may be Type B, such as a device presence type, the proximity threshold may be Threshold C, such as having a RSSI value indicating the device is within a few feet of the primary device 102, the application type may be Type D, such as a photo sharing application, the time range may be from Time E to Time F, such as from 8:00 am to 8:00 pm, the device state may be State G, such as not currently having an application invoked, and/or one or more other conditions such as Condition X.

The application handler 144 may then determine whether the application 146 at issue is already invoked on the primary device 102. For example, when the application 146 is utilized for displaying photographs on a display of the primary device 102, a user may provide user input requesting display of such photographs and the application 146 may be invoked to cause the photographs to be displayed. When the presence event is detected, the application 146 may already be invoked such that the primary device 102 is displaying the photographs. In these examples, the system 106 may determine to refrain from interrupting the existing use of the application 146 by attempting to invoke the application 146 again in response to the presence event. However, in examples where the application 146 is not currently invoked, the application handler 144 may send an invocation request and context data associated with the request to the application 146.

The context data may include any data associated with the presence event, the processes performed prior to sending the invocation request to the application 146, and/or any other information that may be utilized by the application 146 to perform actions. For example, the context data may indicate that the invocation request is being made based on detection of a presence event instead of based on voice input requesting invocation. The context data may also include the personal device information, which may assist the application 146 in invoking the application 146 in a certain way that is specific to the personal device 104 in question. Utilizing the photograph example above, the device identifier of the personal device 104 may be utilized to determine which photos are to be displayed, such as photos of a specific user associated with the personal device 104. In this way, the context data may be utilized to invoke the application 146 to provide a personalized experience for the user.

The application 146 may return an invocation response. The invocation response may include data representing a directive to be performed by the primary device 102 and/or the personal device 104. Examples of directives include instructions to cause the primary device 102 to output audio, output images, cause another device to perform an action, cause the personal device 104 to perform an action, etc. The data representing the directive may be sent to the primary device 102 and/or to the personal device 104 to perform an action based on the directive. By so doing, detection of a presence event, such as detection of a personal device 104 within a proximity of a primary device 102, may cause an application 146 associated with that personal device 104 to be automatically invoked without the user providing user input, such as voice input, as would more typically be done. The predefined conditions described herein may limit automatic invocation to situations where doing so would be desirable and secure.

It should be noted that while text data is described as a type of data utilized to communicate between various components of the system 106 and/or other systems and/or devices, the components of the system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the system 106 and the associated functionality of those components as described herein may be performed by one or more of the devices 102, 104. Additionally, or alternatively, some or all of the components and/or functionalities associated with the devices 102, 104 may be performed by the system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 126, and/or the processor(s) described with respect to the components of the system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 126, and/or the processor(s) described with respect to the components of the system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 126, and/or the processor(s) described with respect to the components of the system 106 may possess its own local memory, which also may store program components, program data, and/or one or more operating systems.

The memory 114, 130, and/or the memory described with respect to the components of the system 106 may include volatile and nonvolatile memory, removable and non-removable media implemented in any method or technology for storage of information, such as computer-readable instructions, data structures, program component, or other data. Such memory 114, 130, and/or the memory described with respect to the components of the system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 130, and/or the memory described with respect to the components of the system 106 may be implemented as computer-readable storage media ("CRSM"), which may be any available physical media accessible by the processor(s) 110, 126, and/or the processor(s) described with respect to the system 106 to execute instructions stored on the memory 114, 130, and/or the memory described with respect to the components of the system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 130, and/or the memory described with respect to the components of the system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 128, and/or the network interface(s) described with respect to the components of the system 106 may enable messages between the components and/or devices shown in system 100 and/or with one or more other polling systems, as well as other networked devices. Such network interface(s) 112, 128, and/or the network interface(s) described with respect to the components of the system 106 may include one or more network interface controllers (NICs) or other types of transceiver devices to send and receive messages over the network 108.

For instance, each of the network interface(s) 112, 128, and/or the network interface(s) described with respect to the components of the system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 128, and/or the network interface(s) described with respect to the components of the system 106 may include a wide area network (WAN) component to enable message over a wide area network.

In some instances, the system 106 may be local to an environment associated the devices 102, 104. For instance, the system 106 may be located within one or more of the devices 102, 104. In some instances, some or all of the functionality of the system 106 may be performed by one or more of the devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device in a home and/or office environment, a self-driving automobile, a bus, an airplane, a camper, a trailer, and/or other similar object having a computer to perform its own sensor processing, etc.

Figure 2:
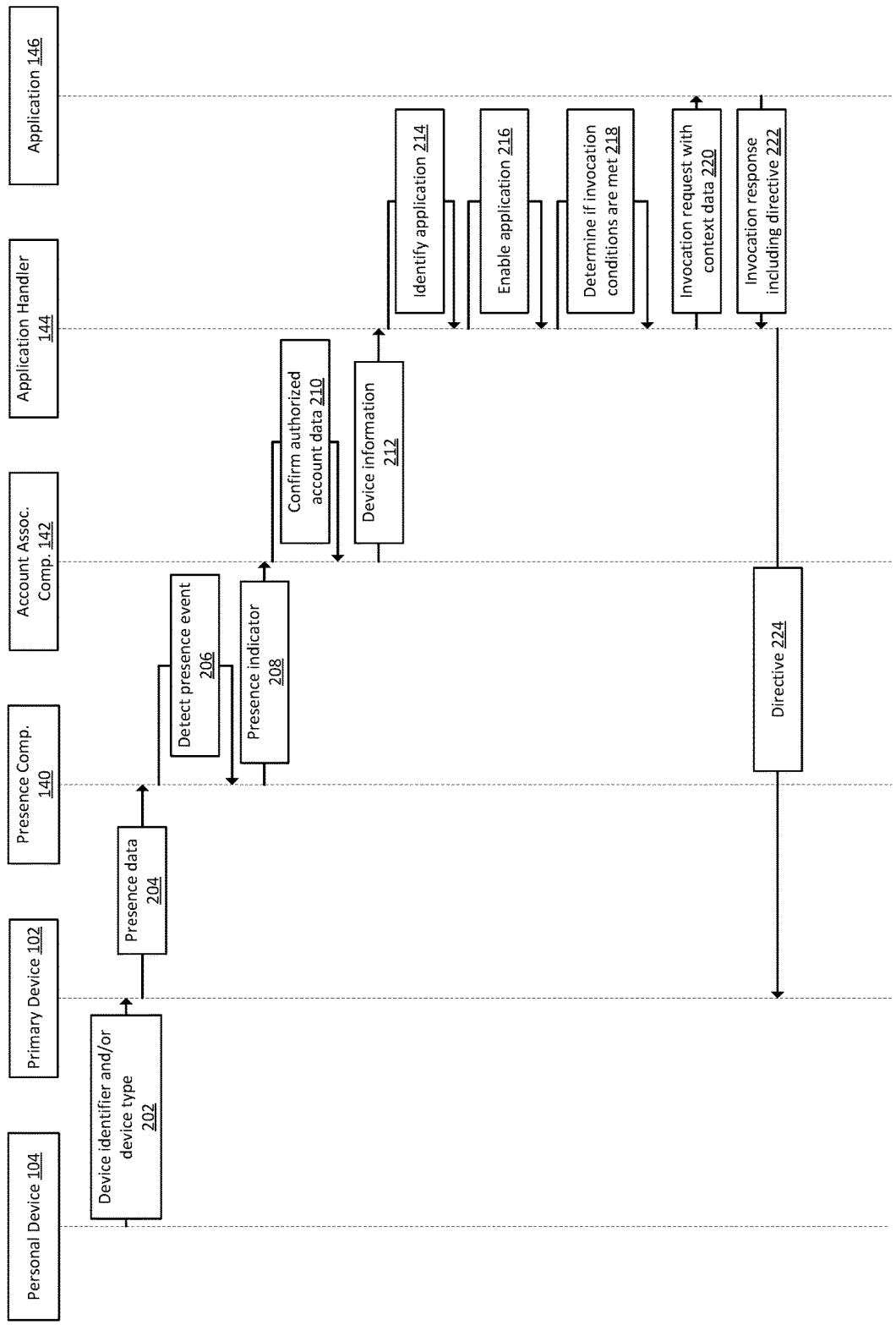
FIG. 2 illustrates a sequence diagram of example operations for presence-based application invocation.

FIG. 2 illustrates a sequence diagram of example operations for presence-based application invocation. The order of operations described in FIG. 2 is provided by way of example, and not as a limitation. Some or all of the operations may be performed in a different order and/or in parallel.

At block 202, the process may include a personal device 104 sending a signal including a device identifier and/or device type to a primary device 102. For example, a beacon component of the personal device may be configured to send a signal that may be received by the primary device 102. The signal may include data associated with the personal device 104, such as a device identifier of the personal device 104 and/or a device type of the personal device 104, for example.

At block 204, the process may include the primary device sending presence data to a presence component 140. For example, the primary device 102 may receive the signal and may send presence data to a system associated with the primary device 102. The presence data sent to the system may include the device identifier for the personal device 104, the device type, an identifier of the primary device 102 that received the signal, and/or other data associated with the received signal and/or environmental conditions associated with the primary device 102 when the signal was received. For example, the data may include signal strength data, timing data, account identifiers, and/or sensor data from the primary device 102 and/or one or more other devices associated with an environment in which the primary device 102 is situated. The sensor data may include, for example, audio data, image data, device state data, device usage data, etc.

At block 206, the process may include the presence component 140 detecting a presence event. For example, detection of the presence event may include determining that the personal device 104 is in proximity to the primary device 102. The presence event may additionally, or alternatively, include the personal device being within a threshold distance of the primary device 102, detection of user speech and/or user movement, detection of a user based on image data, etc.

At block 208, the process may include the presence component 140 sending a presence indicator to an account association component 142. The presence indicator may initiate the process of determining whether to invoke an application in association with the primary device 102 based at least in part on the presence event, as opposed to in response to a user command.

At block 210, the process may include the account association component 142 confirming that the account data associated with the personal device 104 corresponds to account data associated with the primary device 102 such that the account data is authorized to be accessed and utilized on the primary device 102. For example, the signal from the personal device 104 may include the device identifier of the personal device 104. The device identifier may be associated with given account data, such as when the device is registered and/or otherwise setup by a user. Additionally, the primary device 102 may be associated with account data. The account data may be associated with the primary device 102 during an out-of-the-box experience and/or account data may be dynamically associated with a primary device 102. For example, when the primary device 102 is disposed in a communal space and/or a space where users reside temporarily, such as a hotel, place of business, etc., then users authorized to utilize the primary device 102 may change over time and thus account data for those users may be associated with the primary device 102 over time as well. In these and other examples, the account association component 142 may determine whether the account data associated with the personal device 104 corresponds to account data associated with the primary device 102. Utilizing a hotel embodiment as an example, a user may check into a room of a hotel that includes a primary device 102. The hotel checking process may include causing the primary device 102 to be associated with an account associated with the hotel guest and that account may also be associated with the personal device 104 of the user. In this example, the guest's personal device 104 and the primary device 102 of the user's room are associated with the same account data, whereas other primary devices of other rooms are not associated with the user's account data. When the account data of the personal device 104 corresponds to account data of the primary device 102, the process of automatically invoking one or more applications on the primary device may continue.

At block 212, the process may include the account association component 142 sending device information associated with the personal device 104 to an application handler 144. The data associated with the presence event may be any data that may be utilized by the application handler 144 to identify the application 146 to be invoked based at least in part on the presence event. In examples, this data may be the device identifier of the personal device 104 and/or a device type of the personal device 104.

At block 214, the process may include the application handler 144 identifying an application 146 associated with the personal device 104. For example, the personal device 104 may be a wristband utilized to, among other things, gain access to activities associated with a hotel. Those activities may include gaining access to hotel attractions, gaining access to pictures taken while at the attractions, etc. An application 146 may have been developed for performing actions associated with the wristband, such as to view the taken pictures.

At block 216, the process may include the application handler 144 enabling the application 146. For example, the application handler 144 may be configured to determine whether one or more conditions for the automatic invocation of the selected application 146 have been met. The one or more conditions may have been predefined based on developer input associated with the application 146 and/or based at least in part on user preferences and/or settings associated with the speech processing system. The development component 138 may be configured to receive input indicating the one or more conditions described herein. Additional input that may be received and utilized by the development component 138 includes contexts associated with automatic invocation of applications 146, actions performable by the applications 146, etc. Some nonlimiting examples of conditions include device type, detected presence type, personal device proximity thresholds, a type of the application at issue, timing conditions, device state conditions, time lapse since last invocation of the application, device settings, and/or application functionality. When the one or more conditions are met, the application handler 144 may determine whether the application 146 has been enabled for use on the primary device 102. For example, the application 146 may be one of hundreds if not thousands of potential applications that may be utilized by the primary device 102 to respond to user commands. Generally, select applications 146 are first enabled for use on the primary device 102 before those applications 146 can be invoked. As such, the application handler 144 may determine if the application 146 at issue is enabled, and if not, may cause the application 146 to be invoked. This process may be performed, in examples, without requesting user input.

At block 218, the process may include the application handler 144 determining whether one or more invocation conditions have been met. For example, when the application 146 is utilized for displaying photographs on a display of the primary device 102, a user may provide user input requesting display of such photographs and the application 146 may be invoked to cause the photographs to be displayed. When the presence event is detected, the application 146 may already be invoked such that the primary device 102 is displaying the photographs. In these examples, the system 106 may determine to refrain from interrupting the existing use of the application 146 by attempting to invoke the application 146 again in response to the presence event. Additional conditions may include, for example, whether the user account at issue has stored an indication that the user has opted out of automatic invocation of applications. In these examples, a user may request, such as through input to a personal device and/or through voice input, that automatic invocation of applications, and/or certain applications, not occur. Data indicating this user input may be stored in the user account. Additional conditions may include other indicators that a user and/or entity associated with the personal device, the primary device, the environment in which the primary device is disposed, etc. has requested that automatic invocation of applications, and/or certain applications, not occur. Other conditions, including the conditions described elsewhere herein may also be checked.

In this way, the system described herein may support application developers to provide for automatic invocation of those applications in situations where the developers desire to have automatic invocation and not in undesirable situations.

At block 220, the process may include the application handler 144 sending an invocation request and context data to the application 146. In examples where the application 146 is not currently invoked, the application handler 144 may send the invocation request and context data associated with the request to the application 146. The context data may include any data associated with the presence event, the processes performed prior to sending the invocation request to the application 146, and/or any other information that may be utilized by the application 146 to perform actions. For example, the context data may indicate that the invocation request is being made based on detection of a presence event instead of based on voice input requesting invocation. The context data may also include the personal device information, which may assist the application 146 in invoking the application 146 in a certain way that is specific to the personal device 104 in question. Utilizing the photograph example above, the device identifier of the personal device 104 may be utilized to determine which photos are to be displayed, such as photos of a specific user associated with the personal device 104. In this way, the context data may be utilized to invoke the application 146 to provide a personalized experience for the user.

At block 222, the process may include the application 146 sending an invocation response including a directive to the application handler 144. Examples of directives include instructions to cause the primary device 102 to output audio, output images, cause another device to perform an action, cause the personal device 104 to perform an action, etc.

At block 224, the process may include the application handler 144 sending the directive to the primary device 102. For example, the data representing the directive may be sent to the primary device 102 and/or to the personal device 104 to perform an action based on the directive. By so doing, detection of a presence event, such as detection of a personal device 104 within a proximity of a primary device 102, may cause an application 146 associated with that personal device 104 to be automatically invoked without the user providing user input, such as voice input, to invoke the application 146 as would more typically be done. The predefined conditions described herein may limit automatic invocation to situations where doing so would be desirable and secure.

Figure 3:
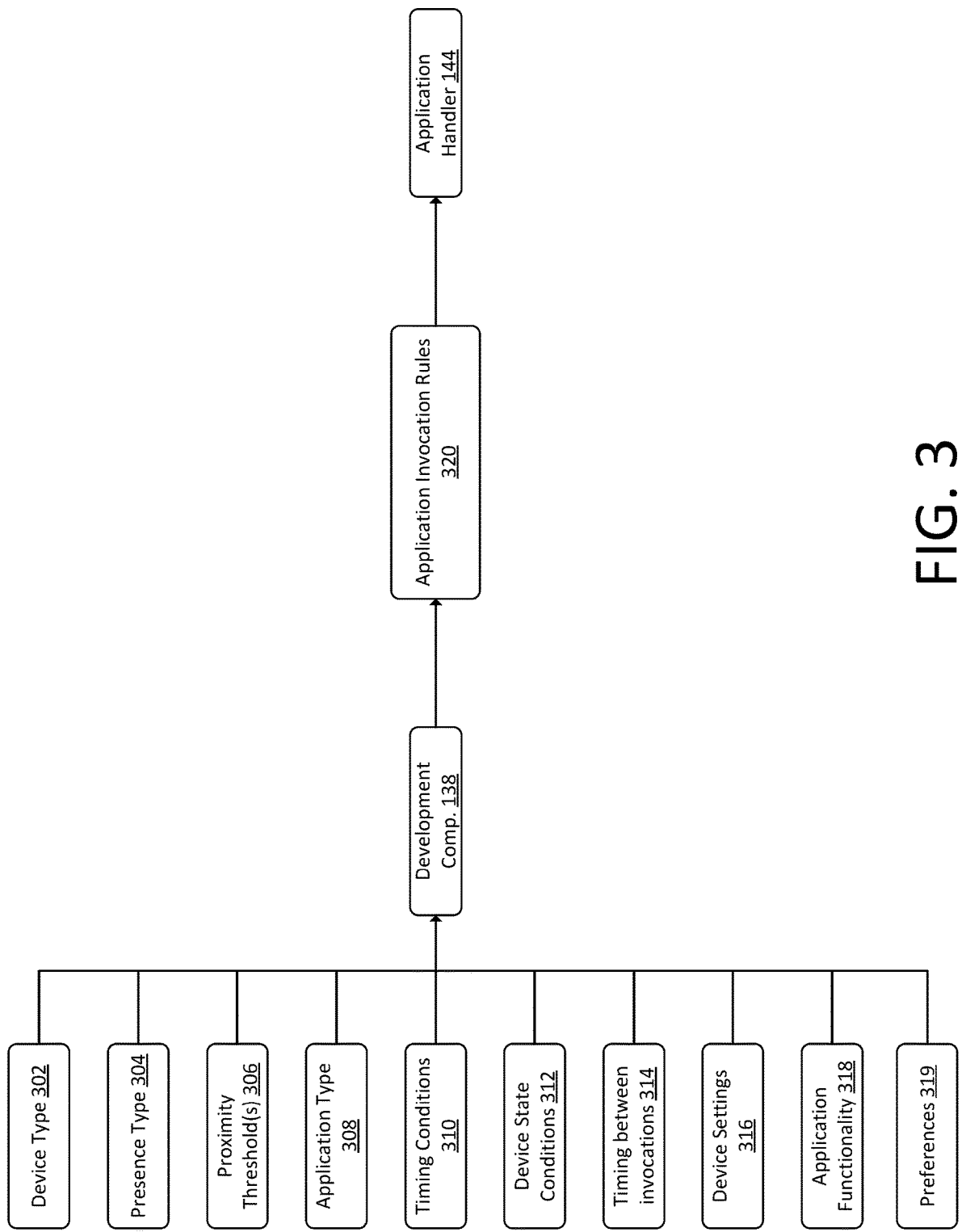
FIG. 3 illustrates a conceptual diagram of development options utilized to generate rules for automatic invocation of applications based on presence events.

FIG. 3 illustrates a conceptual diagram of development options utilized to generate rules for automatic invocation of applications based on presence events.

For example, developers of the applications may elect to take advantage of the automatic application invocation processes described herein. To do so, in addition to developing the functionality of an application, developments may provide input associated with presence-based application invocation. The input may include indicating that the application should be automatically invoked upon detection of given presence events as well as one or more conditions that are to be met before the application is invoked. Some nonlimiting examples of conditions include device type, detected presence type, personal device proximity thresholds, a type of the application at issue, timing conditions, device state conditions, time lapse since last invocation of the application, device settings, and/or application functionality.

For example, using FIG. 3 as an example data representing the device type 302 may be provided to a development component 138. The device type 302 may indicate which device type and/or device types are to be in proximity to a primary device to cause invocation of the application. In these examples, the developer may provide more than one personal device and desire to only have a portion of the personal devices involved in presence-based application invocation. The presence type 304 may also be provided to the development component 138. Presence type 304 may indicate which of several presence events are to be associated with presence-based application invocation. For example, presence types 304 may include detection of the personal device, detection of user speech, detection of user movements, detection of a user as represented in image data, detection of device state changes, and/or a combination of some or all of these nonlimiting presence types 304. The develop may provide input indicating which of these presence types 304 are to be detected before presence-based application invocation should occur. The presence types 304 may also include confidence values associated with detection of presence events and/or durations of detected presence events.

The proximity threshold(s) 306 may indicate a threshold distance at which a personal device and/or user is to be from a primary device before presence-based application invocation may occur. Signal strength values associated with signals sent from the personal device to the primary device may be utilized to determine proximity. Other data may also be used, such as image data, beamforming of audio data, etc. The application type 308 may indicate which application(s) of multiple applications associated with a developer are authorized to be invoked based on detection of a presence event. The timing conditions 310 may indicate period of time of a day and/or given days at which presence-based application invocation is authorized and/or is unauthorized.

The device state conditions 312 may indicate certain device states that are to be present and/or are to be absent for presence-based application invocation to occur. Examples of device state conditions may include the primary device not being associated with an active application, the primary device being in an "on" state, one or more devices in the environment being in an "on" and/or "active" state, etc. The timing between invocations 314 may indicate a "cool down" period between invocations of the application. For example, the cool down period may be a matter of minutes, hours, and/or days. During this period of time, presence-based application invocation may be disabled. The device settings 316 may indicate settings of the personal device and/or the primary device that are needed to authorize presence-based application invocation. The application functionality 318 may indicate limitations on what the application is configured to do when invoke based on a presence event. Additional conditions may include, for example, user preferences 319 indicating that applications should not be automatically invoked as described herein. For example, the user account at issue may store an indication that the user has opted out of automatic invocation of applications. In these examples, a user may request, such as through input to a personal device and/or through voice input, that automatic invocation of applications, and/or certain applications, not occur. Data indicating this user input may be stored in the user account. Additional conditions may include other indicators that a user and/or entity associated with the personal device, the primary device, the environment in which the primary device is disposed, etc. has requested that automatic invocation of applications, and/or certain applications, not occur.

Some or all of these conditions, and/or other conditions not specifically listed herein, may be received at the development component 138. The development component 138 may then be configured to utilize these conditions to generate one or more rules 320 for the presence-based invocation of applications. These rules 320 may be stored in a database and queried by an application handler 144 when a presence event is detected. The conditions represented in the rules may be checked by the application handler 144 before performing one or more of the operations described herein. For example, enablement of an application, sending of invocation requests, generation of context data, etc. may be performed based at least in part on the one or more conditions being met.

FIGS. 4-7 illustrates processes for presence-based application invocation. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, 8 and 9, although the processes may be implemented in a wide variety of other environments, architectures and systems.

Figure 4:
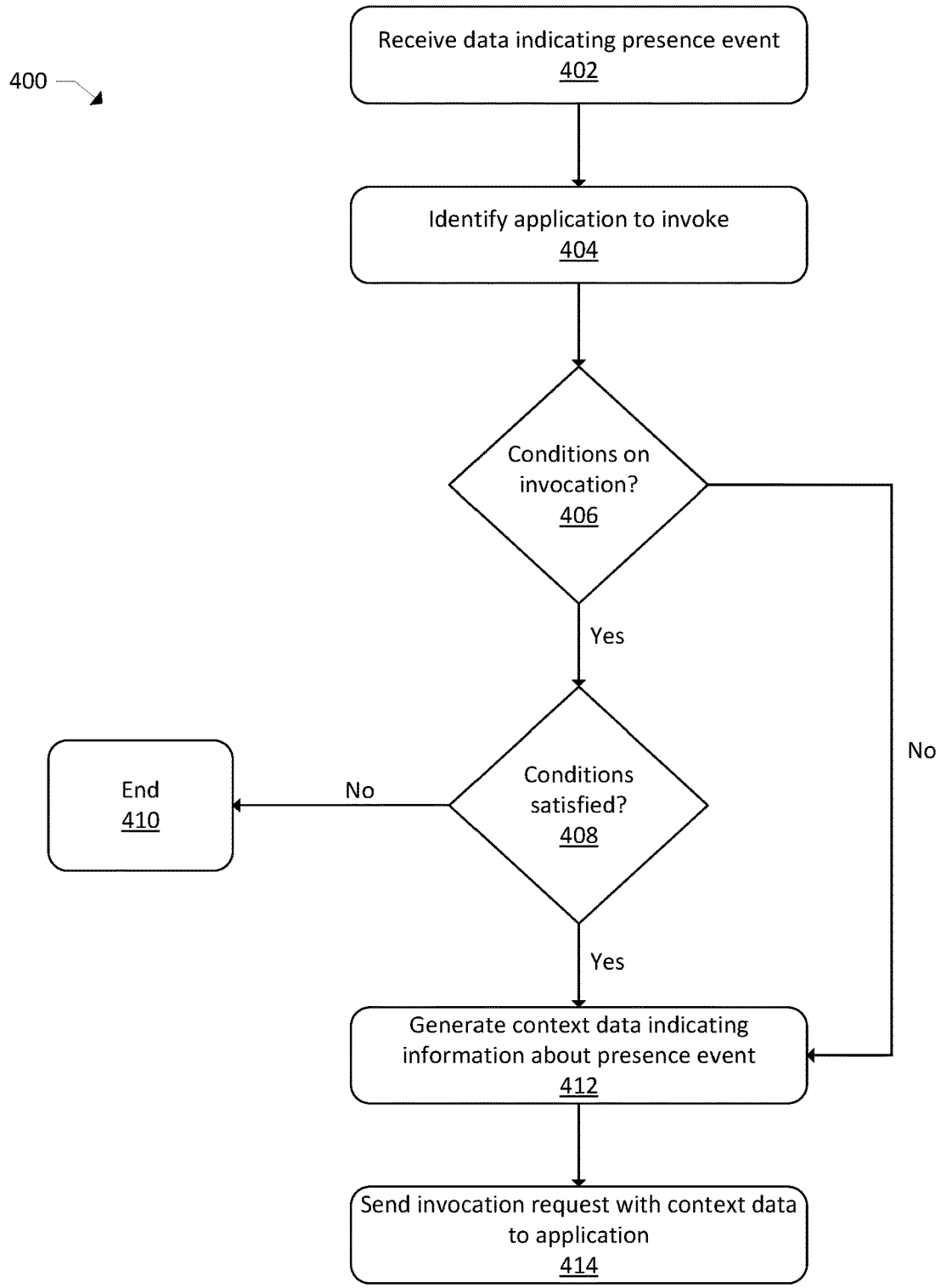
FIG. 4 illustrates a flow diagram of an example process for determining whether predetermined conditions associated with a presence event have been satisfied prior to invoking an application.

FIG. 4 illustrates a flow diagram of an example process 400 for determining whether predetermined conditions associated with a presence event have been satisfied prior to invoking an application. The order in which the operations or steps are described is not intended to be construed as a limitation, and any number of the described operations may be combined in any order and/or in parallel to implement process 400.

At block 402, the process 400 may include receiving data indicating detection of a presence event at a primary device. For example, a beacon component of a personal device may be configured to send a signal that may be received by a primary device. The signal may include data associated with the personal device, such as a device identifier of the personal device and/or a device type of the personal device, for example. The primary device may send presence data to a presence component. For example, the primary device may receive the signal and may send presence data to a system associated with the primary device. The presence data sent to the system may include the device identifier for the personal device, the device type, an identifier of the primary device that received the signal, and/or other data associated with the received signal and/or environmental conditions associated with the primary device when the signal was received. For example, the data may include signal strength data, timing data, account identifiers, and/or sensor data from the primary device and/or one or more other devices associated with an environment in which the primary device is situated. The sensor data may include, for example, audio data, image data, device state data, device usage data, etc.

The presence component may detect a presence event. For example, detection of the presence event may include determining that the personal device is in proximity to the primary device. The presence event may additionally, or alternatively, include the personal device being within a threshold distance of the primary device, detection of user speech and/or user movement, detection of a user based on image data, etc. An account association component may confirm that the account data associated with the personal device corresponds to account data associated with the primary device such that the account data is authorized to be accessed and utilized on the primary device. For example, the signal from the personal device may include the device identifier of the personal device. The device identifier may be associated with given account data, such as when the device is registered and/or otherwise setup by a user. Additionally, the primary device may be associated with account data. The account data may be associated with the primary device during an out-of-the-box experience and/or account data may be dynamically associated with a primary device. For example, when the primary device is disposed in a communal space and/or a space where users reside temporarily, such as a hotel, place of business, etc., then users authorized to utilize the primary device may change over time and thus account data for those users may be associated with the primary device over time as well. In these and other examples, the account association component may determine whether the account data associated with the personal device corresponds to account data associated with the primary device. Utilizing a hotel embodiment as an example, a user may check into a room of a hotel that includes a primary device. The hotel checking process may include causing the primary device to be associated with an account associated with the hotel guest and that account may also be associated with the personal device of the user. In this example, the guest's personal device and the primary device of the user's room are associated with the same account data, whereas other primary devices of other rooms are not associated with the user's account data. When the account data of the personal device 104 corresponds to account data of the primary device, the process of automatically invoking one or more applications on the primary device may continue.

Thereafter, the account association component may send device information associated with the personal device to an application handler. The data associated with the presence event may be any data that may be utilized by the application handler to identify the application to be invoked based at least in part on the presence event. In examples, this data may be the device identifier of the personal device and/or a device type of the personal device.

At block 404, the process 400 may include identifying an application to invoke based on the presence event. For example, the personal device may be a wristband utilized to, among other things, gain access to activities associated with a hotel. Those activities may include gaining access to hotel attractions, gaining access to pictures taken while at the attractions, etc. An application may have been developed for performing actions associated with the wristband, such as to view the taken pictures.

At block 406, the process 400 may include determining whether one or more conditions on invocation of the application are present. Some nonlimiting examples of conditions include device type, detected presence type, personal device proximity thresholds, a type of the application at issue, timing conditions, device state conditions, time lapse since last invocation of the application, device settings, and/or application functionality.

In examples where the one or more conditions are present, the process 400 may include, at block 408, determining whether the one or more conditions have been satisfied. For example, the presence data received from the primary device may be utilized to determine whether any conditions associated with the presence event are satisfied. Additionally, the device identifiers of the personal device and the primary device may be utilized to determine whether any device-related conditions and/or application-related conditions are satisfied. In other examples, the system may query the devices at issue and/or other devices and/or sensors for data to determine whether the conditions are met.

When the one or more conditions are not satisfied, the process 400 may end at block 410. In these examples, even though the presence event has been detected, the application associated with the personal device is not invoked because at least one of the conditions placed on automatic invocation of the device have not been met. By so doing, the system may refrain from invoking the application at an undesirable time.

In examples where the one or more conditions have been satisfied, or when no conditions on invocation are present as determined at block 406, the process 400 may include, at block 412, generating context data indication information about the presence event. The context data may include any data associated with the presence event, the processes performed prior to sending the invocation request to the application, and/or any other information that may be utilized by the application to perform actions. For example, the context data may indicate that the invocation request is being made based on detection of a presence event instead of based on voice input requesting invocation. The context data may also include the personal device information, which may assist the application in invoking the application in a certain way that is specific to the personal device in question. Utilizing the photograph example above, the device identifier of the personal device may be utilized to determine which photos are to be displayed, such as photos of a specific user associated with the personal device. In this way, the context data may be utilized to invoke the application to provide a personalized experience for the user.

At block 414, the process 400 may include sending an invocation request and the context data to the application. The invocation request may cause the application to be invoked and the context data may be utilized by the application to determine how to invoke the application.

Figure 5:
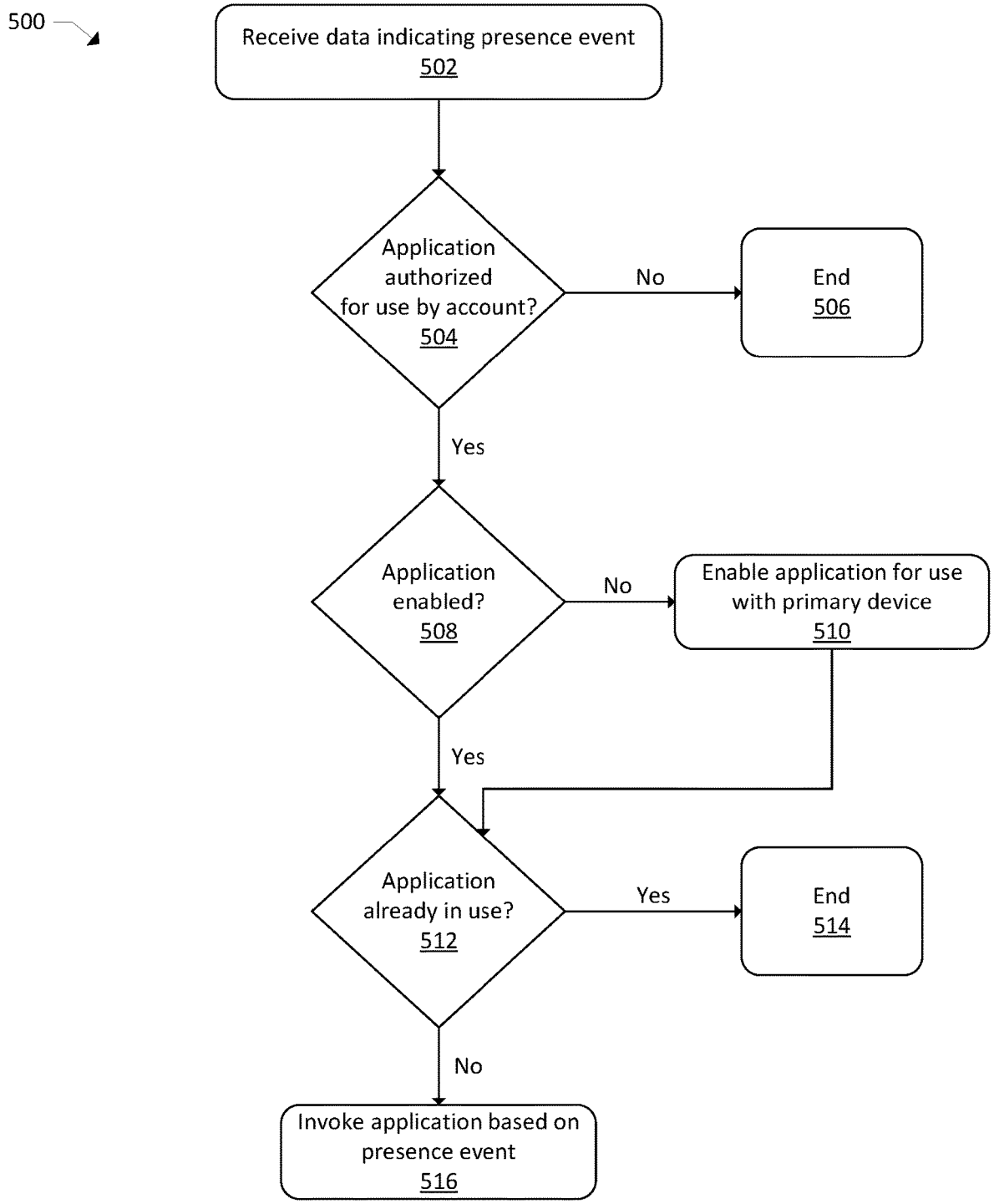
FIG. 5 illustrates a flow diagram of an example process for enabling applications and performing runtime checks prior to automatically invoking an application based on a presence event.

FIG. 5 illustrates a flow diagram of an example process 500 for enabling applications and performing runtime checks prior to automatically invoking an application based on a presence event. The order in which the operations or steps are described is not intended to be construed as a limitation, and any number of the described operations may be combined in any order and/or in parallel to implement process 500.

At block 502, the process 500 may include receiving data indicating detection of a presence event. For example, a beacon component of a personal device may be configured to send a signal that may be received by a primary device. The signal may include data associated with the personal device, such as a device identifier of the personal device and/or a device type of the personal device, for example. The primary device may send presence data to a presence component. For example, the primary device may receive the signal and may send presence data to a system associated with the primary device. The presence data sent to the system may include the device identifier for the personal device, the device type, an identifier of the primary device that received the signal, and/or other data associated with the received signal and/or environmental conditions associated with the primary device when the signal was received. For example, the data may include signal strength data, timing data, account identifiers, and/or sensor data from the primary device and/or one or more other devices associated with an environment in which the primary device is situated. The sensor data may include, for example, audio data, image data, device state data, device usage data, etc.

The presence component may detect a presence event. For example, detection of the presence event may include determining that the personal device is in proximity to the primary device. The presence event may additionally, or alternatively, include the personal device being within a threshold distance of the primary device, detection of user speech and/or user movement, detection of a user based on image data, etc.

At block 504, the process 500 may include determining whether an identified application is authorized for use by an account associated with the primary device. For example, an account association component may confirm that the account data associated with the personal device corresponds to account data associated with the primary device such that the account data is authorized to be accessed and utilized on the primary device. For example, the signal from the personal device may include the device identifier of the personal device. The device identifier may be associated with given account data, such as when the device is registered and/or otherwise setup by a user. Additionally, the primary device may be associated with account data. The account data may be associated with the primary device during an out-of-the-box experience and/or account data may be dynamically associated with a primary device. For example, when the primary device is disposed in a communal space and/or a space where users reside temporarily, such as a hotel, place of business, etc., then users authorized to utilize the primary device may change over time and thus account data for those users may be associated with the primary device over time as well. In these and other examples, the account association component may determine whether the account data associated with the personal device corresponds to account data associated with the primary device. Utilizing a hotel embodiment as an example, a user may check into a room of a hotel that includes a primary device. The hotel checking process may include causing the primary device to be associated with an account associated with the hotel guest and that account may also be associated with the personal device of the user. In this example, the guest's personal device and the primary device of the user's room are associated with the same account data, whereas other primary devices of other rooms are not associated with the user's account data. When the account data of the personal device corresponds to account data of the primary device, the process of automatically invoking one or more applications on the primary device may continue.

Thereafter, the account association component may send device information associated with the personal device to an application handler. The data associated with the presence event may be any data that may be utilized by the application handler to identify the application to be invoked based at least in part on the presence event. In examples, this data may be the device identifier of the personal device and/or a device type of the personal device.

In examples where the application is not authorized for use by the account, the process 500 may end at block 506. In these examples, the account data associated with the personal device may not correspond with the account data associated with the primary device. As such, invoking an application associated with the personal device on the primary device may not be desirable and the system may refrain from invoking the application in these examples.

In examples where the application is authorized for use by the account, the process 500 may include, at block 508, determining whether the identified application is enabled. For example, the application may be one of hundreds if not thousands of potential applications that may be utilized by the primary device to respond to user commands. Generally, select applications are first enabled for use on the primary device before those applications can be invoked.

In examples where the application is not enabled, the process 500 may include, at block 510, enabling the application for use with the primary device. For example, the application handler may determine if the application at issue is enabled, and if not, may cause the application to be invoked. This process may be performed, in examples, without requesting user input.

In examples where the application is already enabled, and/or after enablement as described at block 510, the process 500 may include, at block 512, determining whether the application is already in use. For example, when the application is utilized for displaying photographs on a display of the primary device, a user may provide user input requesting display of such photographs and the application may be invoked to cause the photographs to be displayed. When the presence event is detected, the application may already be invoked such that the primary device is displaying the photographs. Additional conditions to invocation may also be checked. For example, a user account at issue may store an indication that the user has opted out of automatic invocation of applications. In these examples, a user may request, such as through input to a personal device and/or through voice input, that automatic invocation of applications, and/or certain applications, not occur. Data indicating this user input may be stored in the user account. Additional conditions may include other indicators that a user and/or entity associated with the personal device, the primary device, the environment in which the primary device is disposed, etc. has requested that automatic invocation of applications, and/or certain applications, not occur.

In examples where the application is already in use, the process 500 may end at block 514. Using the example above, the system may determine to refrain from interrupting the existing use of the application by attempting to invoke the application again in response to the presence event.

In examples where the application is not already in use, the process 500 may include, at block 516, invoking the application based on the presence event. For example, the application handler may send the invocation request and context data associated with the request to the application. The context data may include any data associated with the presence event, the processes performed prior to sending the invocation request to the application, and/or any other information that may be utilized by the application to perform actions. For example, the context data may indicate that the invocation request is being made based on detection of a presence event instead of based on voice input requesting invocation. The context data may also include the personal device information, which may assist the application in invoking the application in a certain way that is specific to the personal device in question. Utilizing the photograph example above, the device identifier of the personal device may be utilized to determine which photos are to be displayed, such as photos of a specific user associated with the personal device. In this way, the context data may be utilized to invoke the application to provide a personalized experience for the user. The application may send an invocation response including a directive to the application handler. Examples of directives include instructions to cause the primary device to output audio, output images, cause another device to perform an action, cause the personal device to perform an action, etc.

FIG. 6 illustrates a flow diagram of an example process 600 for presence-based application invocation. The order in which the operations or steps are described is not intended to be construed as a limitation, and any number of the described operations may be combined in any order and/or in parallel to implement process 600.

At block 602, the process 600 may include receiving, from a voice interface device, first data indicating that a first device is in proximity of the voice interface device, the first data including a device identifier of the first device. For example, a beacon component of the first device, which may be described as a personal device, may be configured to send a signal that may be received by the voice interface device, which may be described as a primary device. The signal may include data associated with the personal device, such as a device identifier of the personal device and/or a device type of the personal device, for example. The primary device may send presence data to a presence component. For example, the primary device may receive the signal and may send presence data to a system associated with the primary device. The presence data sent to the system may include the device identifier for the personal device, the device type, an identifier of the primary device that received the signal, and/or other data associated with the received signal and/or environmental conditions associated with the primary device when the signal was received. For example, the data may include signal strength data, timing data, account identifiers, and/or sensor data from the primary device and/or one or more other devices associated with an environment in which the primary device is situated. The sensor data may include, for example, audio data, image data, device state data, device usage data, etc.

The presence component may detect a presence event. For example, detection of the presence event may include determining that the personal device is in proximity to the primary device. The presence event may additionally, or alternatively, include the personal device being within a threshold distance of the primary device, detection of user speech and/or user movement, detection of a user based on image data, etc.

At block 604, the process 600 may include determining, utilizing the device identifier, account data that has been associated with the first device. For example, an account association component may confirm that the account data associated with the personal device corresponds to account data associated with the primary device such that the account data is authorized to be accessed and utilized on the primary device. For example, the signal from the personal device may include the device identifier of the personal device. The device identifier may be associated with given account data, such as when the device is registered and/or otherwise setup by a user.

At block 606, the process 600 may include determining that the voice interface device associated with the account data when the first data is received. For example, the account data may be associated with the primary device during an out-of-the-box experience and/or account data may be dynamically associated with a primary device. For example, when the primary device is disposed in a communal space and/or a space where users reside temporarily, such as a hotel, place of business, etc., then users authorized to utilize the primary device may change over time and thus account data for those users may be associated with the primary device over time as well. In these and other examples, the account association component may determine whether the account data associated with the personal device corresponds to account data associated with the primary device.

Utilizing a hotel embodiment as an example, a user may check into a room of a hotel that includes a primary device. The hotel checking process may include causing the primary device to be associated with an account associated with the hotel guest and that account may also be associated with the personal device of the user. In this example, the guest's personal device and the primary device of the user's room are associated with the same account data, whereas other primary devices of other rooms are not associated with the user's account data. When the account data of the personal device corresponds to account data of the primary device, the process of automatically invoking one or more applications on the primary device may continue.

At block 608, the process 600 may include determining, utilizing the device identifier, a skill associated with the first device, the skill configured to be utilized by a speech processing system to perform actions responsive to voice commands. For example, the personal device may be a wristband utilized to, among other things, gain access to activities associated with a hotel. Those activities may include gaining access to hotel attractions, gaining access to pictures taken while at the attractions, etc. An application may have been developed for performing actions associated with the wristband, such as to view the taken pictures.

At block 610, the process 600 may include receiving second data indicating one or more conditions for invoking the skill, the one or more conditions defining presence indications that are to be detected for the skill to be invoked. The one or more conditions may have been predefined based on developer input associated with the application and/or based at least in part on user preferences and/or settings associated with the speech processing system. Some non-limiting examples of conditions include device type of the personal device and/or the primary device, detected presence type, personal device proximity thresholds, a type of the application at issue, timing conditions, device state conditions, time lapse since last invocation of the application, device settings, and/or application functionality. Additional conditions may include, for example, whether the user account at issue has stored an indication that the user has opted out of automatic invocation of applications. In these examples, a user may request, such as through input to a personal device and/or through voice input, that automatic invocation of applications, and/or certain applications, not occur. Data indicating this user input may be stored in the user account. Additional conditions may include other indicators that a user and/or entity associated with the personal device, the primary device, the environment in which the primary device is disposed, etc. has requested that automatic invocation of applications, and/or certain applications, not occur.

At block 612, the process 600 may include determining, utilizing third data received from one or more sensors and indicating environmental conditions associated with an environment in which the voice interface device is disposed, that the one or more conditions have been satisfied. For example, sensor data from the primary device, secondary device, and/or one or more other devices may be generated and analyzed to determine whether the conditions on automatic invocation of an application should be performed.

At block 614, the process 600 may include causing the skill to be invoked in association with the voice interface device based at least in part on: receiving the first data; the account data being associated with the voice interface device; and the one or more conditions being satisfied. For example, the application handler may send the invocation request and context data associated with the request to the application. The context data may include any data associated with the presence event, the processes performed prior to sending the invocation request to the application, and/or any other information that may be utilized by the application to perform actions. For example, the context data may indicate that the invocation request is being made based on detection of a presence event instead of based on voice input requesting invocation. The context data may also include the personal device information, which may assist the application in invoking the application in a certain way that is specific to the personal device in question. Utilizing the photograph example above, the device identifier of the personal device may be utilized to determine which photos are to be displayed, such as photos of a specific user associated with the personal device. In this way, the context data may be utilized to invoke the application to provide a personalized experience for the user.

At block 616, the process 600 may include generating, utilizing the skill and based at least in part on skill being invoked, second data representing a directive configured to cause the voice interface device to perform an action. For example, the application may send an invocation response including a directive to the application handler. Examples of directives include instructions to cause the primary device to output audio, output images, cause another device to perform an action, cause the personal device to perform an action, etc.

Additionally, or alternatively, the process 600 may include receiving third data indicating one or more conditions for invoking the skill, the one or more conditions defining presence indications that are to be detected for the skill to be invoked. The process 600 may also include storing the third data in a database associated with the speech processing system and, in response to receiving the first data, querying the database for the third data. The process 600 may also include, in response to the third data, querying one or more sensors for fourth data indicating environmental conditions associated with an environment in which the voice interface device is disposed. The process 600 may also include determining, utilizing the fourth data that the one or more conditions have been satisfied. In these examples, causing the skill to be invoked may be in response to the one or more conditions having been satisfied.

Additionally, or alternatively, the process 600 may include generating third data indicating characteristics of a presence event detected in association with the voice interface device. The process 600 may also include generating fourth data representing an invocation request associated with the skill, the fourth data including the characteristics of the presence event. The process 600 may also include determining the directive from fifth data received in response to the invocation request, the fifth data indicating functionality of the skill associated with the characteristics of the presence event.

Additionally, or alternatively, the process 600 may include identifying the skill from multiple skills utilizing the device type of the first device. The process 600 may also include determining that the skill has yet to be enabled for use in association with the voice interface device. The process 600 may also include enabling the skill in association with the voice interface device in response to receiving the first data while the voice interface device is associated with the account data.

Additionally, or alternatively, the process 600 may include determining that the one or more conditions include the skill being unutilized when the first data is received. The process 600 may also include determining that, at a time when the first data is received, the skill is unutilized in association with the voice interface device. In these examples, causing the skill to be invoked may be in response to the skill being unutilized in association with the voice interface device at the time.

Figure 7:
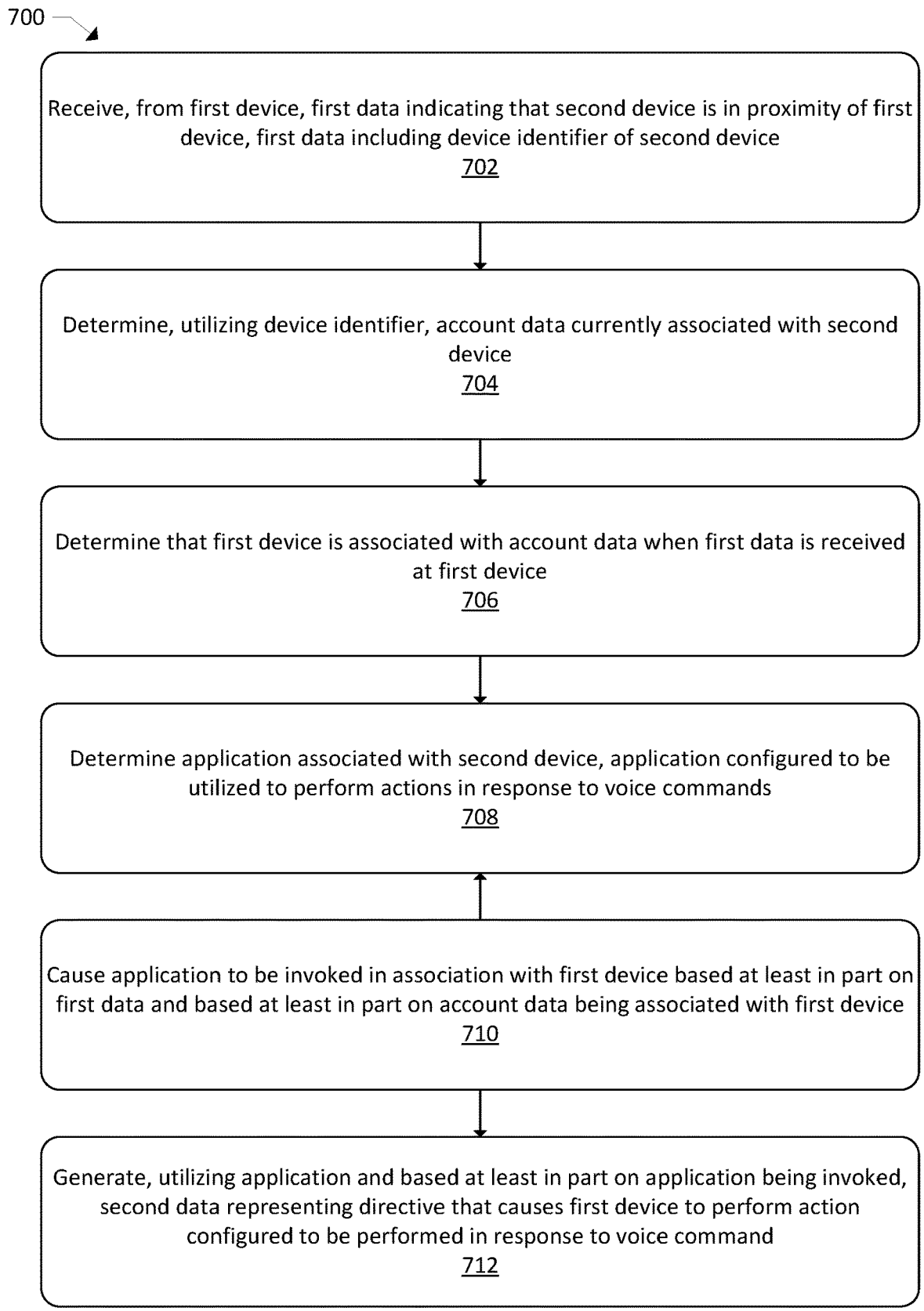
FIG. 7 illustrates a flow diagram of another example process for presence-based application invocation.

FIG. 7 illustrates a flow diagram of another example process 700 for presence-based application invocation. The order in which the operations or steps are described is not intended to be construed as a limitation, and any number of the described operations may be combined in any order and/or in parallel to implement process 700.

At block 702, the process 700 may include receiving, from a first device, first data indicating that a second device is in proximity of the first device, the first data including a device identifier of the second device. For example, a beacon component of the first device, which may be described as a personal device, may be configured to send a signal that may be received by the voice interface device, which may be described as a primary device. The signal may include data associated with the personal device, such as a device identifier of the personal device and/or a device type of the personal device, for example. The primary device may send presence data to a presence component. For example, the primary device may receive the signal and may send presence data to a system associated with the primary device. The presence data sent to the system may include the device identifier for the personal device, the device type, an identifier of the primary device that received the signal, and/or other data associated with the received signal and/or environmental conditions associated with the primary device when the signal was received. For example, the data may include signal strength data, timing data, account identifiers, and/or sensor data from the primary device and/or one or more other devices associated with an environment in which the primary device is situated. The sensor data may include, for example, audio data, image data, device state data, device usage data, etc.

The presence component may detect a presence event. For example, detection of the presence event may include determining that the personal device is in proximity to the primary device. The presence event may additionally, or alternatively, include the personal device being within a threshold distance of the primary device, detection of user speech and/or user movement, detection of a user based on image data, etc.

At block 704, the process 700 may include determining, utilizing the device identifier, account data currently associated with the second device. For example, an account association component may confirm that the account data associated with the personal device corresponds to account data associated with the primary device such that the account data is authorized to be accessed and utilized on the primary device. For example, the signal from the personal device may include the device identifier of the personal device. The device identifier may be associated with given account data, such as when the device is registered and/or otherwise setup by a user.

At block 706, the process 700 may include determining that the first device is associated with the account data when the first data is received. For example, the account data may be associated with the primary device during an out-of-the-box experience and/or account data may be dynamically associated with a primary device. For example, when the primary device is disposed in a communal space and/or a space where users reside temporarily, such as a hotel, place of business, etc., then users authorized to utilize the primary device may change over time and thus account data for those users may be associated with the primary device over time as well. In these and other examples, the account association component may determine whether the account data associated with the personal device corresponds to account data associated with the primary device. Utilizing a hotel embodiment as an example, a user may check into a room of a hotel that includes a primary device. The hotel checking process may include causing the primary device to be associated with an account associated with the hotel guest and that account may also be associated with the personal device of the user. In this example, the guest's personal device and the primary device of the user's room are associated with the same account data, whereas other primary devices of other rooms are not associated with the user's account data. When the account data of the personal device corresponds to account data of the primary device, the process of automatically invoking one or more applications on the primary device may continue.

At block 708, the process 700 may include determining an application associated with the second device, the application configured to be utilized to perform actions. For example, the personal device may be a wristband utilized to, among other things, gain access to activities associated with a hotel. Those activities may include gaining access to hotel attractions, gaining access to pictures taken while at the attractions, etc. An application may have been developed for performing actions associated with the wristband, such as to view the taken pictures.

At block 710, the process 700 may include causing the application to be invoked in association with the first device based at least in part on the first data and based at least in part on the account data being associated with the first device. For example, the application handler may send the invocation request and context data associated with the request to the application. The context data may include any data associated with the presence event, the processes performed prior to sending the invocation request to the application, and/or any other information that may be utilized by the application to perform actions. For example, the context data may indicate that the invocation request is being made based on detection of a presence event instead of based on voice input requesting invocation. The context data may also include the personal device information, which may assist the application in invoking the application in a certain way that is specific to the personal device in question. Utilizing the photograph example above, the device identifier of the personal device may be utilized to determine which photos are to be displayed, such as photos of a specific user associated with the personal device. In this way, the context data may be utilized to invoke the application to provide a personalized experience for the user.

At block 712, the process 700 may include generating, utilizing the application and based at least in part on the application being invoked, second data representing a directive that causes the first device to perform an action. For example, the application may send an invocation response including a directive to the application handler. Examples of directives include instructions to cause the primary device to output audio, output images, cause another device to perform an action, cause the personal device to perform an action, etc.

Additionally, or alternatively, the process 700 may include receiving third data indicating a presence condition for invoking the application. The process 700 may also include storing an indication of the presence condition in a database. The process 700 may also include based at least in part on identifying the indication in the database, querying a sensor for fourth data indicating an environmental condition associated with an environment in which the first device is disposed. The process 700 may also include identifying the presence condition based at least in part on the fourth data. In these examples, causing the application to be invoked may be based at least in part on identifying the presence condition.

Additionally, or alternatively, the process 700 may include generating third data indicating a characteristic of a presence event detected in association with the first device. The process 700 may also include generating fourth data representing an invocation request associated with the application, the fourth data including the characteristic. The process 700 may also include determining the directive from fifth data received in response to the invocation request, the fifth data indicating functionality of the application associated with the characteristic.

Additionally, or alternatively, the process 700 may include identifying the application from multiple applications based at least in part on the device type. The process 700 may also include identifying the application from multiple applications based at least in part on the device type. The process 700 may also include enabling the application in association with the first device based at least in part on receiving the first data while the first device is associated with the account data.

Additionally, or alternatively, the process 700 may include storing, in a database, third data indicating conditions for invoking the application, the conditions indicating a period of time of a day during which the application is prohibited from being invoked in response to detection of a presence event at the first device. The process 700 may also include, based at least in part on receiving fourth data indicating the second device is in proximity to the first device, querying the database for the third data. The process 700 may also include determining, based at least in part on the third data being associated with the application, a time of day at which the fourth data is received and determining that the time of day is within the period of time of the day. The process 700 may also include determining to refrain from invoking the application.

Additionally, or alternatively, the process 700 may include determining that a different application is invoked in association with the first device at a time when the first data is received. The process 700 may also include determining that the different application is a predetermined application indicated as a priority application. The process 700 may also include determining to refrain from invoking the application based at least in part on the different application being invoked when the first data is received and the different application being a priority application.

Additionally, or alternatively, the process 700 may include determining that multiple applications are associated with the second device. The process 700 may also include generating, based at least in part on the second device being associated with the multiple applications, third data indicating a characteristic of a presence event detected in association with the first device. The process 700 may also include selecting the application from the multiple applications based at least in part on the characteristic of the presence event.

Additionally, or alternatively, the process 700 may include determining a user profile associated with a user of the second device. The process 700 may also include identifying a functionality of the application authorized for use in association with the user profile, the functionality being a subset of multiple functionalities of the application. In these examples, the directive may be based at least in part on the functionality.

Figure 8:
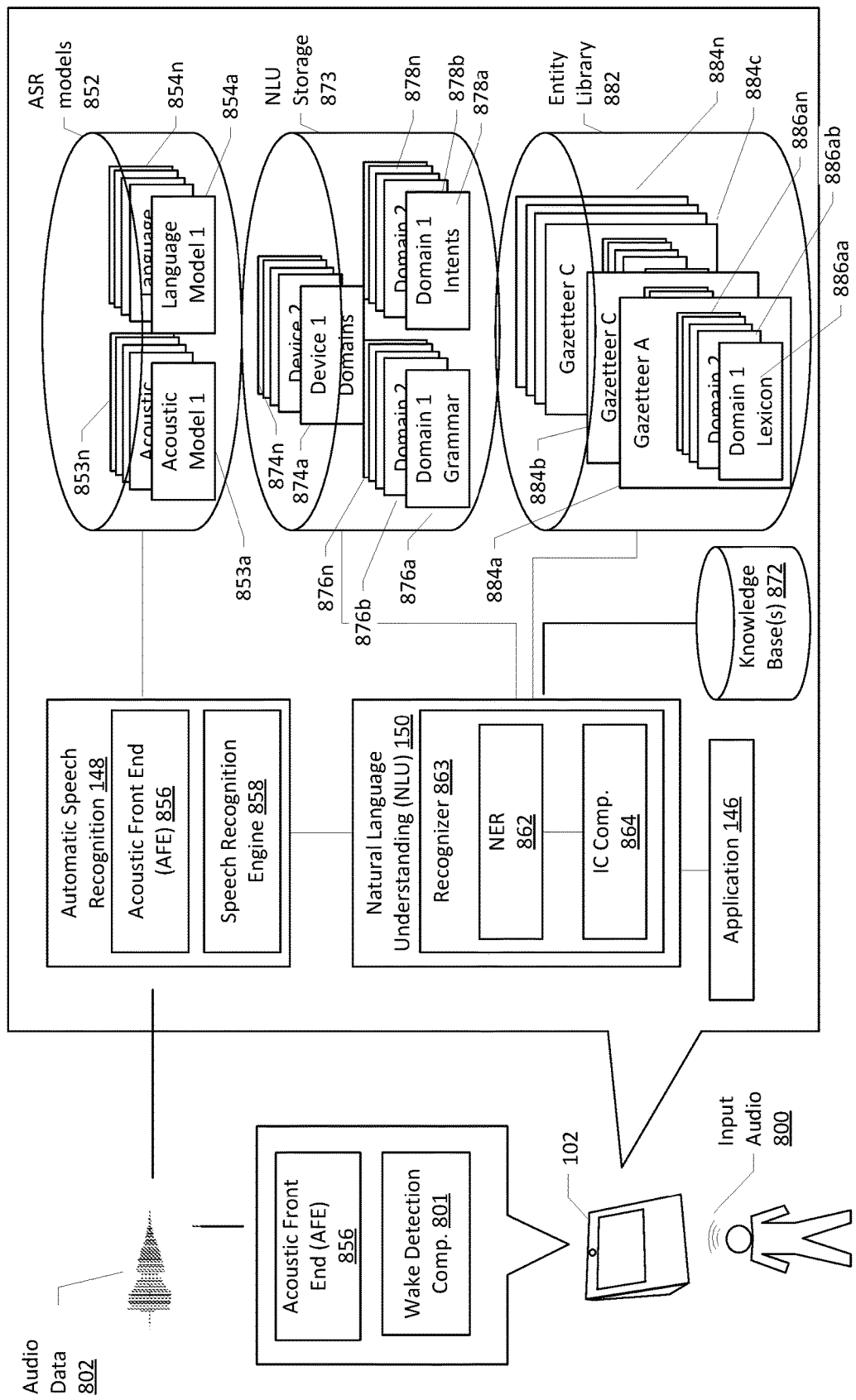
FIG. 8 illustrates a conceptual diagram of components of a speech-processing system for processing audio data provided by one or more devices.

FIG. 8 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 8 may occur directly or across a network 108. An audio capture component, such as a microphone 116 of the device 102, or another device, captures audio 800 corresponding to a spoken utterance. The device 102, using a wake word engine 801, then processes audio data corresponding to the audio 800 to determine if a keyword (such as a wakeword) is detected in the audio data. Following detection of a wakeword, the device 102 processes audio data 802 corresponding to the utterance utilizing an ASR component 148. The audio data 802 may be output from an optional acoustic front end (AFE) 856 located on the device prior to transmission. In other instances, the audio data 802 may be in a different form for processing by a remote AFE 856, such as the AFE 856 located with the ASR component 148.

The wake word engine 801 works in conjunction with other components of the user device, for example a microphone to detect keywords in audio 800. For example, the device may convert audio 800 into audio data, and process the audio data with the wake word engine 801 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 801 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 801 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake." The audio data 802 may include data corresponding to the wakeword. Further, a local device may "wake" upon detection of speech/spoken audio above a threshold, as described herein. An ASR component 148 may convert the audio data 802 into text. The ASR transcribes audio data into text data representing the words of the speech contained in the audio data 802. The text data may then be used by other components for various purposes, such as executing system commands, inputting data, etc. A spoken utterance in the audio data is input to a processor configured to perform ASR which then interprets the utterance based on the similarity between the utterance and pre-established language models 854 stored in an ASR model knowledge base (ASR Models Storage 852). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 853 stored in an ASR Models Storage 852), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 148 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 856 and a speech recognition engine 858. The acoustic front end (AFE) 856 transforms the audio data from the microphone into data for processing by the speech recognition engine 858. The speech recognition engine 858 compares the speech recognition data with acoustic models 853, language models 854, and other data models and information for recognizing the speech conveyed in the audio data. The AFE 856 may reduce noise in the audio data and divide the digitized audio data into frames representing time intervals for which the AFE 856 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 858 may process the output from the AFE 856 with reference to information stored in speech/model storage (852). Alternatively, post front-end processed data (such as feature vectors) may be received by the device executing ASR processing from another source besides the internal AFE. For example, the user device may process audio data into feature vectors (for example using an on-device AFE 856).

The speech recognition engine 858 attempts to match received feature vectors to language phonemes and words as known in the stored acoustic models 853 and language models 854. The speech recognition engine 858 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, display today's photographs?" The wake detection component may identify the wake word, otherwise described as a trigger expression, "Alexa," in the user utterance and may "wake" based on identifying the wake word. The speech recognition engine 858 may identify, determine, and/or generate text data corresponding to the user utterance, here "display today's pictures."

The speech recognition engine 858 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 858 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 150 may include various components, including potentially dedicated processor(s), memory, storage, etc. As shown in FIG. 8, an NLU component 150 may include a recognizer 863 that includes a named entity recognition (NER) component 862 which is used to identify portions of query text that correspond to a named entity that may be recognizable by the system. A downstream process called named entity resolution links a text portion to a specific entity known to the system. To perform named entity resolution, the system may utilize gazetteer information (884a-884n) stored in entity library storage 882. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 148 based on the utterance input audio 800) and attempts to make a semantic interpretation of the text. That is, the NLU process determines the meaning behind the text based on the individual words and then implements that meaning. NLU processing 150 interprets a text string to derive an intent or a desired action from the user as well as the pertinent pieces of information in the text that allow a device (e.g., device 102) to complete that action. For example, if a spoken utterance is processed using ASR 148 and outputs the text "display today's pictures" the NLU process may determine that the user intended to cause a display to present images corresponding to photographs taken on the day of the request.

The NLU 150 may process several textual inputs related to the same utterance. For example, if the ASR 148 outputs N text segments (as part of an N-best list), the NLU may process all N outputs to obtain NLU results.

As will be discussed further below, the NLU process may be configured to parse and tag to annotate text as part of NLU processing. For example, for the text "display today's pictures," "display" may be tagged as a command (to cause a device to present images) and "today's pictures" may be tagged as the naming identifier of the images.

To correctly perform NLU processing of speech input, an NLU process 150 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 862 receives a query in the form of ASR results and attempts to identify relevant grammars and lexical information that may be used to construe meaning. To do so, the NLU component 150 may begin by identifying potential domains that may relate to the received query. The NLU storage 873 includes a database of devices (874a-874n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 863, language model and/or grammar database (876a-876n), a particular set of intents/actions (878a-878n), and a particular personalized lexicon (886). Each gazetteer (884a-884n) may include domain-indexed lexical information associated with a particular user and/or device. For example, the Gazetteer A (884a) includes domain-index lexical information 886aa to 886an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 864 parses the query to determine an intent or intents for each identified domain, where the intent corresponds to the action to be performed that is responsive to the query. Each domain is associated with a database (878a-878n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 864 identifies potential intents for each identified domain by comparing words in the query to the words and phrases in the intents database 878. In some instances, the determination of an intent by the IC component 864 is performed using a set of rules or templates that are processed against the incoming text to identify a matching intent.

In order to generate a particular interpreted response, the NER 862 applies the grammar models and lexical information associated with the respective domain to actually recognize a mention of one or more entities in the text of the query. In this manner, the NER 862 identifies "slots" or values (i.e., particular words in query text) that may be needed for later command processing. Depending on the complexity of the NER 862, it may also label each slot with a type of varying levels of specificity (such as noun, place, device name, device location, city, artist name, song name, amount of time, timer number, or the like). Each grammar model 876 includes the names of entities (i.e., nouns)

commonly found in speech about the particular domain (i.e., generic terms), whereas the lexical information 886 from the gazetteer 884 is personalized to the user(s) and/or the device. For instance, a grammar model associated with the shopping domain may include a database of words commonly used when people discuss shopping.

The intents identified by the IC component 864 are linked to domain-specific grammar frameworks (included in 876) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (876) framework or frameworks may correspond to sentence structures such as "purchase item called 'Item A' from Marketplace A."

For example, the NER component 862 may parse the query to identify words as subject, object, verb, preposition, etc., based on grammar rules and/or models, prior to recognizing named entities. The identified verb may be used by the IC component 864 to identify intent, which is then used by the NER component 862 to identify frameworks. A framework for the intent of "play a song," meanwhile, may specify a list of slots/fields applicable to play the identified "song" and any object modifier (e.g., specifying a music collection from which the song should be accessed) or the like. The NER component 862 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 862 may search the database of generic words associated with the domain (in the knowledge base 872). So, for instance, if the query was "identify this song," after failing to determine which song is currently being output, the NER component 862 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 146. The destination speechlet 146 may be determined based on the NLU output. For example, if the NLU output includes a command to send a message, the destination speechlet 146 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the speechlet 146 may provide some or all of this information to a text-to-speech (TTS) engine. The TTS engine may then generate an actual audio file for outputting the audio data determined by the application (e.g., "okay," or "your photographs are being displayed").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 150 during runtime operations where NLU operations are performed on text (such as text output from an ASR component 148). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 863. Each recognizer may include various NLU components such as an NER component 862, IC component 864 and other components such as an entity resolver, or other components.

For example, a messaging domain recognizer 863-A (Domain A) may have an NER component 862-A that identifies what slots (i.e., portions of input text) may correspond to particular words relevant to that domain. The words may correspond to entities such as (for the messaging domain) a recipient. An NER component 862 may use a machine learning model, such as a domain specific conditional random field (CRF) to both identify the portions corresponding to an entity as well as identify what type of entity corresponds to the text portion. The messaging domain recognizer 863-A may also have its own intent classification (IC) component 864-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 106, as illustrated herein are exemplary, and may be located in a stand-alone device or may be included, in whole or in part, as a component of a larger device or system, may be distributed across a network or multiple devices connected by a network, etc.

Figure 9:
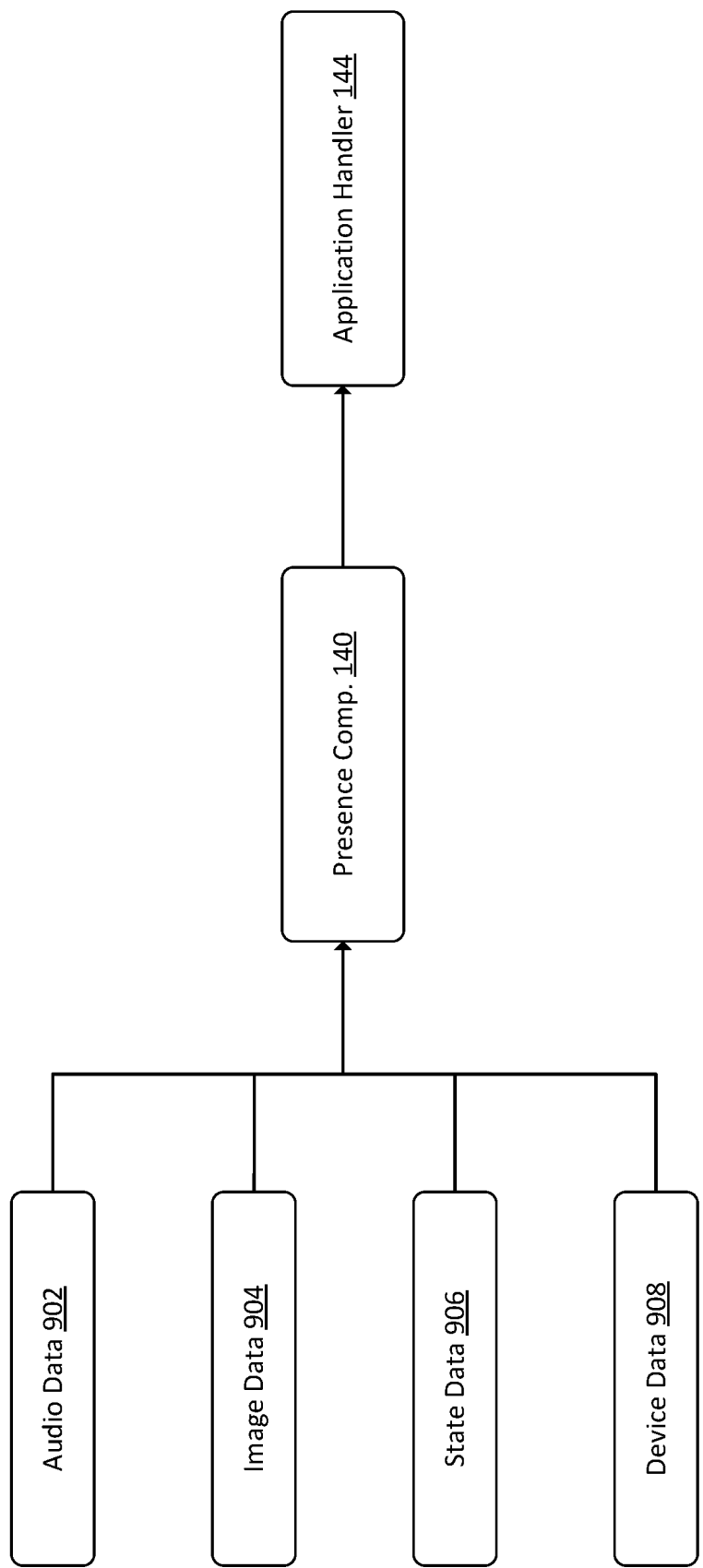
FIG. 9 illustrates a conceptual diagram of example presence detection utilized for presence-based application invocation.

FIG. 9 illustrates a conceptual diagram of example presence detection utilized for automatic application invocation. FIG. 9 depicts example data types that may be utilized by a presence component 140 to detect the presence of a user in an environment.

Example data types for detecting presence may include audio data 902, image data 904, state data 906, and/or device data 908. The audio data 902 may be received from a microphone associated with an environment where a given device is situated. The audio data 902 may be analyzed by the presence component 140 to determine whether the audio data 902 indicates the presence of user speech, footsteps, use of devices in the environment, and/or the presence of other noises that are indicative of a user being present. To do so, the presence component 140 may compare the audio data 902 to reference audio data to detect the presence of such noises. In examples where user speech is to be detected, ASR data may be utilized and/or detection of a wake word may be utilized.

When image data 904 is described herein as being analyzed, that analysis may include the use of computer vision to identify objects depicted in the image data 904. For example, with respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

When state data 906 is utilized, the state data 906 may indicate when and how device states have changed for devices in the environment. For example, when a smart light is turned on, an indication of the change of state from off to on may be stored. The state itself, or the timing of the state change may indicate that a user is present in the environment and/or that the user is likely present.

When device data 908 is utilized, the device data 908 may indicate the presence of a personal device associated with a user, such as a mobile phone and/or a wearable device. These devices may send out beacons that are received at a given primary device, indicating that the devices are proximate to the primary device and also indicating that the user associated with such devices are present.

The data associated with the presence event may be any data that may be utilized by the application handler 144 to identify an application to be invoked based at least in part on the presence event. In examples, this data may be the device identifier of a personal device and/or a device type of the personal device. The application handler 144 may then determine which application of multiple applications is associated with the personal device. For example, the personal device may be a wristband utilized to, among other things, gain access to activities associated with a hotel. Those activities may include gaining access to hotel attractions, gaining access to pictures taken while at the attractions, etc. An application may have been developed for performing actions associated with the wristband, such as to view the taken pictures. The application handler 144 may determine which application is associated with the personal device 104 utilizing the data described herein.

Additionally, the application handler 144 may also be configured to determine whether one or more conditions for the automatic invocation of the selected application have been met. The one or more conditions may have been predefined based on developer input associated with the application and/or based at least in part on user preferences and/or settings associated with the speech processing system. A development component may be configured to receive input indicating the one or more conditions described herein. Additional input that may be received and utilized by the development component includes contexts associated with automatic invocation of applications, actions performable by the applications, etc. Some nonlimiting examples of conditions include device type, detected presence type, personal device proximity thresholds, a type of the application at issue, timing conditions, device state conditions, time lapse since last invocation of the application, device settings, and/or application functionality. When the one or more conditions are met, the application handler 144 may determine whether the application has been enabled for use on the primary device. For example, the application may be one of hundreds if not thousands of potential applications that may be utilized by the primary device to respond to user commands. Generally, select applications are first enabled for use on the primary device before those applications can be invoked. As such, the application handler 144 may determine if the application at issue is enabled, and if not, may cause the application to be invoked. This process may be performed, in examples, without requesting user input.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
   one or more processors; and
   non-transitory computer-readable media storing computer-executable instructions that, when executed by the one or more processors, cause the one or more processors to perform operations comprising:
   receiving, from a voice interface device, first data indicating that a first device is in proximity of the voice interface device, the first data including a device identifier of the first device;
   determining, utilizing the device identifier, account data that has been associated with the first device;
   determining that the voice interface device is associated with the account data when the first data is received;
   determining, utilizing the device identifier, a skill associated with the first device, the skill configured to be utilized by a speech processing system to perform actions responsive to voice commands;
   receiving second data indicating one or more conditions for invoking the skill, the one or more conditions defining presence indications that are to be detected for the skill to be invoked;
   determining, utilizing third data received from one or more sensors and indicating environmental conditions associated with an environment in which the voice interface device is disposed, that the one or more conditions have been satisfied;
   causing the skill to be invoked in association with the voice interface device based at least in part on:
   receiving the first data;
   the account data being associated with the voice interface device; and
   the one or more conditions being satisfied; and
   generating, utilizing the skill and based at least in part on skill being invoked, second data representing a directive configured to cause the voice interface device to perform an action.

2. The system of claim 1, the operations further comprising:
   determining that the one or more conditions include the skill being unutilized when the first data is received;
   determining that, at a time when the first data is received, the skill is unutilized in association with the voice interface device; and
   wherein causing the skill to be invoked is in response to the skill being unutilized in association with the voice interface device at the time.

3. The system of claim 1, the operations further comprising:
   generating third data indicating characteristics of a presence event detected in association with the voice interface device;
   generating fourth data representing an invocation request associated with the skill, the fourth data including the characteristics of the presence event; and
   determining the directive from fifth data received in response to the invocation request, the fifth data indicating functionality of the skill associated with the characteristics of the presence event.

4. The system of claim 1, wherein the first data indicates a device type of the first device, and the operations further comprise:
   identifying the skill from multiple skills utilizing the device type of the first device;
   determining that the skill has yet to be enabled for use in association with the voice interface device; and
   enabling the skill in association with the voice interface device in response to receiving the first data while the voice interface device is associated with the account data.

5. A method, comprising:
   receiving, from a first device, first data indicating that a second device is in proximity of the first device, the first data including a device identifier of the second device;
   determining, utilizing the device identifier, account data currently associated with the second device;
   determining that the first device is associated with the account data when the first data is received;

determining an application associated with the second device, the application configured to be utilized to perform actions;
receiving second data indicating a condition for invoking the application, the condition defining a presence indication;
determining, utilizing third data received from one or more sensors, that the condition defining the presence indication has been satisfied;
causing the application to be invoked in association with the first device based at least in part on:
the first data;
the account data being associated with the first device; and
the condition being satisfied; and
generating, utilizing the application and based at least in part on the application being invoked, fourth data representing a directive that causes the first device to perform an action.

6. The method of claim 5, further comprising:
storing an indication of the condition in a database;
based at least in part on identifying the indication in the database, querying the one or more sensors for the third data indicating an environmental condition associated with an environment in which the first device is disposed; and
identifying the condition based at least in part on the third data.

7. The method of claim 5, further comprising:
identifying a characteristic of a presence event detected in association with the first device;
generating an invocation request associated with the application, the invocation request including the characteristic; and
determining the directive from fifth data received in response to the invocation request, the fifth data indicating functionality of the application associated with the characteristic.

8. The method of claim 5, wherein the first data indicates a device type of the second device, and the method further comprises:
identifying the application from multiple applications based at least in part on the device type;
determining that the application has yet to be enabled for use in association with the first device; and
enabling the application in association with the first device based at least in part on receiving the first data while the first device is associated with the account data.

9. The method of claim 5, further comprising:
based at least in part on receiving fifth data indicating the second device is in proximity to the first device, querying a database for a period of time of a day during which the application is prohibited from being invoked;
determining, based at least in part on a response from the database, a time of day at which the fifth data is received;
determining that the time of day is within the period of time of the day; and
determining to refrain from invoking the application.

10. The method of claim 5, further comprising:
determining that a different application is invoked in association with the first device at a time when the first data is received;
determining that the different application is a predetermined application indicated as a priority application; and
determining to refrain from invoking the application based at least in part on the different application being invoked when the first data is received and the different application being a priority application.

11. The method of claim 5, further comprising:
determining that multiple applications are associated with the second device;
generating, based at least in part on the second device being associated with the multiple applications, third data indicating a characteristic of a presence event detected in association with the first device; and
selecting the application from the multiple applications based at least in part on the characteristic of the presence event.

12. The method of claim 5, further comprising:
determining a user profile associated with a user of the second device;
identifying a functionality of the application authorized for use in association with the user profile, the functionality being a subset of multiple functionalities of the application; and
wherein the directive is based at least in part on the functionality.

13. A system, comprising:
one or more processors; and
non-transitory computer-readable media storing computer-executable instructions that, when executed by the one or more processors, cause the one or more processors to perform operations comprising:
receiving, from a first device, first data indicating that a second device is in proximity of the first device, the first data including a device identifier of the second device;
determining, utilizing the device identifier, account data currently associated with the second device;
determining that the first device is associated with the account data when the first data is received;
determining an application associated with the second device, the application configured to be utilized to perform actions;
receiving second data indicating a condition for invoking the application, the condition defining a presence indication;
determining, utilizing third data received from one or more sensors, that the condition defining the presence indication has been satisfied;
causing the application to be invoked in association with the first device based at least in part on;
the first data;
the account data being associated with the first device; and
the condition being satisfied; and
generating, utilizing the application and based at least in part on application being invoked, fourth data representing a directive causing the first device to perform an action.

14. The system of claim 13, the operations further comprising:
storing an indication of the condition in a database;
based at least in part on identifying the indication in the database, querying the one or more sensors for the third data indicating an environmental condition associated with an environment in which the first device is disposed; and
identifying the condition based at least in part on the third data.

15. The system of claim 13, the operations further comprising:
- identifying a characteristic of a presence event detected in association with the first device;
- generating an invocation request associated with the application, the invocation request including the characteristic; and
- determining the directive from fifth data received in response to the invocation request, the fifth data indicating functionality of the application associated with the characteristic.

16. The system of claim 13, wherein the first data indicates a device type of the second device, and the operations further comprise:
- identifying the application from multiple applications based at least in part on the device type;
- determining that the application has yet to be enabled for use in association with the first device; and
- enabling the application in association with the first device based at least in part on receiving the first data while the first device is associated with the account data.

17. The system of claim 13, the operations further comprising:
- based at least in part on receiving fifth data indicating the second device is in proximity to the first device, querying a database for a period of time of a day during which the application is prohibited from being invoked;
- determining, based at least in part on a response from the database, a time of day at which the fifth data is received;
- determining that the time of day is within the period of time of the day; and
- determining to refrain from invoking the application.

18. The system of claim 13, the operations further comprising:
- determining that a different application is invoked in association with the first device at a time when the first data is received;
- determining that the different application is a predetermined application indicated as a priority application; and
- determining to refrain from invoking the application based at least in part on the different application being invoked when the first data is received and the different application being a priority application.

19. The system of claim 13, the operations further comprising:
- determining that multiple applications are associated with the second device;
- generating, based at least in part on the second device being associated with the multiple applications, third data indicating a characteristic of a presence event detected in association with the first device; and
- selecting the application from the multiple applications based at least in part on the characteristic of the presence event.

20. The system of claim 13, the operations further comprising:
- determining a user profile associated with a user of the second device;
- identifying a functionality of the application authorized for use in association with the user profile, the functionality being a subset of multiple functionalities of the application; and
- wherein the directive is based at least in part on the functionality.

* * * * *